United States Patent
Kubota et al.

(10) Patent No.: US 12,216,302 B2
(45) Date of Patent: Feb. 4, 2025

(54) OPTICAL FILM, POLARIZING PLATE, IMAGE DISPLAY DEVICE, AND OPTICAL FILM SELECTION METHOD

(71) Applicant: DAI NIPPON PRINTING CO., LTD., Tokyo (JP)

(72) Inventors: Shosei Kubota, Kashiwa (JP); Yoshiko Tanaka, Tokorozawa (JP); Norio Ishii, Nagareyama (JP); Takashi Kuroda, Moriya (JP); Hiroaki Segawa, Nagareyama (JP); Akinobu Ushiyama, Moriya (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 488 days.

(21) Appl. No.: 17/764,456

(22) PCT Filed: Sep. 30, 2020

(86) PCT No.: PCT/JP2020/037067
§ 371 (c)(1),
(2) Date: Mar. 28, 2022

(87) PCT Pub. No.: WO2021/065978
PCT Pub. Date: Apr. 8, 2021

(65) Prior Publication Data
US 2022/0365265 A1    Nov. 17, 2022

(30) Foreign Application Priority Data
Sep. 30, 2019 (JP) ................. 2019-181043

(51) Int. Cl.
*G02B 5/30* (2006.01)
*G02F 1/1335* (2006.01)
*G02F 1/13363* (2006.01)

(52) U.S. Cl.
CPC ......... *G02B 5/3083* (2013.01); *G02B 5/3025* (2013.01); *G02F 1/133528* (2013.01); *G02F 1/13363* (2013.01)

(58) Field of Classification Search
CPC ................ G02B 5/3025; G02B 5/3083; G02F 1/113363
(Continued)

(56) References Cited

U.S. PATENT DOCUMENTS

2009/0237786 A1* 9/2009 Yoshihara ............ G02B 1/105
428/212
2011/0128477 A1* 6/2011 Izaki ................... G02B 5/3083
349/96
(Continued)

FOREIGN PATENT DOCUMENTS

| CN | 109891281 | 6/2019 |
| JP | 2005-316350 | 11/2005 |

(Continued)

OTHER PUBLICATIONS

International Search Report of PCT/JP2020/037067, Dec. 8, 2020, 7 pages including English translation.
(Continued)

*Primary Examiner* — Ricky D Shafer
(74) *Attorney, Agent, or Firm* — HSML P.C.

(57) ABSTRACT

Provided is an optical film that can suppress rainbow unevenness when viewed with the naked eyes without increasing the in-plane phase difference. The optical film has a low-refractive index layer on a plastic film, the plastic film is a biaxially stretched plastic film with an in-plane phase difference of 2500 nm or less, the low-refractive index layer is located on the outermost surface, and the optical film has a region in which ΔEab satisfies specific conditions, wherein the ΔEab is calculated from the differences between the L*
(Continued)

value, the a* value, and the b* value obtained by measuring a laminate 1 including the optical film, the polarizer, and the surface light source under specific conditions and the L* value, the a* value, and the b* value obtained by measuring a laminate 2 including the polarizer and the surface light source under specific conditions, respectively.

8 Claims, 4 Drawing Sheets

(58) Field of Classification Search
USPC .................................................. 359/489.07
See application file for complete search history.

(56) References Cited

U.S. PATENT DOCUMENTS

| | | |
|---|---|---|
| 2019/0204485 A1 | 7/2019 | Jung et al. |
| 2019/0235146 A1* | 8/2019 | Osato .................. G02F 1/13363 |
| 2019/0317353 A1 | 10/2019 | Shim et al. |
| 2020/0012147 A1* | 1/2020 | Osato .................. G02B 5/3083 |
| 2020/0264357 A1* | 8/2020 | Yoshinari ............... H10K 50/86 |
| 2021/0003759 A1* | 1/2021 | Kim .................... G02B 5/3016 |
| 2021/0020870 A1* | 1/2021 | Osato .................. H10K 59/8791 |
| 2021/0043874 A1* | 2/2021 | Kim .................... H10K 59/8791 |
| 2022/0291436 A1* | 9/2022 | Kim .................... H10K 59/8791 |

FOREIGN PATENT DOCUMENTS

| | | |
|---|---|---|
| JP | 2009-014886 | 1/2009 |
| JP | 2009-162996 | 7/2009 |
| JP | 2010-054670 | 3/2010 |
| JP | 2010-204630 | 9/2010 |
| JP | 2011-107198 | 6/2011 |
| JP | 2011-112928 | 6/2011 |
| JP | 2012-230200 | 11/2012 |
| JP | 5169215 B2 | 3/2013 |
| JP | 2016-106241 | 6/2016 |
| TW | 201937212 | 9/2019 |

OTHER PUBLICATIONS

Office Action issued for Taiwanese Patent Application No. 109134154, Dec. 8, 2023, 38 pages including machine translation.

* cited by examiner (A)

(B)

(C)

OPTICAL FILM, POLARIZING PLATE, IMAGE DISPLAY DEVICE, AND OPTICAL FILM SELECTION METHOD

TECHNICAL FIELD

The present disclosure relates to an optical film, a polarizing plate, an image display device, and a method for selecting an optical film.

BACKGROUND ART

For optical members such as image display devices, various optical plastic films are often used. For example, a plastic film is used for protecting a polarizer constituting the polarizing plate in an image display device having a polarizing plate on a display element.

Plastic films for image display devices used as such polarizer protective films preferably have excellent mechanical strength. Therefore, stretched plastic films are preferably used as plastic films for image display devices.

In the case of disposing a stretched plastic film on a polarizer, a problem is that rainbow pattern unevenness is observed due to the stretched plastic film disturbing the polarization state of the linearly polarized light that has passed through the polarizer. In order to solve such a problem, techniques such as Patent Literatures 1 to 3 have been proposed. Hereinafter, the "rainbow pattern unevenness" may be referred to as "rainbow unevenness" in this description.

Patent Literature 1 discloses a liquid crystal display device that can eliminate rainbow unevenness when viewing an image through polarized sunglasses by using a specific white light source as a light source of the image display device, setting the in-plane phase difference (retardation) of the stretched plastic film as high as 3000 nm or more and 30000 nm or less, and disposing the absorption axis of the polarizer and the slow axis of the stretched plastic film at substantially 45 degrees.

However, the device of Patent Literature 1 needs to use a stretched plastic film having large in-plane phase difference. Further, a stretched plastic film having large in-plane phase difference is generally uniaxially stretched and therefore has problems such as easy tearing in the stretching direction.

Patent Literature 2 discloses a polarizing plate protective film having a specific range of reflectance at Brewster's angle. Patent Literature 3 discloses a polarizing plate protective film in which the difference between the reflectance of P waves at an incident angle of 50 degrees and the reflectance of S waves is 20% or less.

The polarizing plate protective films of Patent Literature 2 and 3 aim to eliminate rainbow unevenness visually by reducing the reflectance difference between the P waves and the S waves, which are polarization components of the light directed toward the viewer from the inside of the image display device, without increasing the in-plane phase difference of the film as in Patent Literature 1.

A biaxially stretched plastic film is generally obtained by obtaining a casting film formed by melting and extruding plastics constituting the film and then stretching the casting film in the flow and width directions. At this time, it is known that the orientation angle differs depending on the position taken in the width direction due to the so-called Boeing phenomenon.

In general, it is said that the optical property is stable near the center of the biaxially stretched plastic film in the width direction, but there may be cases in which rainbow unevenness cannot be eliminated in the polarizing plate protective films of Patent Literatures 2 and 3 even when using a biaxially stretched plastic film obtained from the vicinity of the center.

CITATION LIST

Patent Literature

PTL 1: JP 2011-107198 A
PTL 2: JP 2009-14886 A
PTL 3: JP 2010-204630 A

SUMMARY OF INVENTION

Technical Problem

It is an object of the present disclosure to provide an optical film that can suppress rainbow unevenness when viewed with the naked eyes without increasing the in-plane phase difference, and a polarizing plate and an image display device that use the optical film. Further, it is an object of the present disclosure to provide a method for selecting an optical film that can suppress rainbow unevenness when viewed with the naked eyes without increasing the in-plane phase difference.

Solution to Problem

The present disclosure provides [1] to [4] below.
[1] An optical film comprising a low-refractive index layer on a plastic film, wherein
the plastic film is a biaxially stretched plastic film with an in-plane phase difference of 2500 nm or less,
the low-refractive index layer is located on the outermost surface of the optical film, and
the optical film comprises a region in which the difference between the maximum value and the minimum value of $\Delta Eab$ is less than 17.0, wherein the $\Delta Eab$ is calculated as follows:
a laminate 1 is subjected to measurement 1 to calculate $L^*$ value, $a^*$ value, and $b^*$ value in the $L^*a^*b^*$ color system; a laminate 2 is subjected to measurement 2 to calculate $L^*$ value, $a^*$ value, and $b^*$ value in the $L^*a^*b^*$ color system; and based on the results of the measurement 1 and the measurement 2, the $\Delta Eab$ is calculated under condition 1:
<Measurement 1>
the laminate 1 is produced by laminating a polarizer and the optical film on a surface light source in this order, in the laminate 1, the optical film is disposed so that the surface on the low-refractive index layer side faces the side opposite to the polarizer, and the polarizer is disposed so that the angle formed by the absorption axis of the polarizer and the horizontal or vertical direction of the surface light source falls within ±5 degrees, and the angle formed by the absorption axis of the polarizer and the slow axis of the biaxially stretched plastic film of the optical film falls within 90 degrees±5 degrees,
the surface light source of the laminate 1 is displayed in white, the transmitted light emitted from the low-refractive index layer side of the laminate 1 is measured at 1 degree intervals in ranges of an elevation angle of 0 degrees or more and 80 degrees or less and an azimuth angle of 0 degrees or more and 359 degrees or less, to calculate $L^*$ value, $a^*$ value, and $b^*$ value in the $L^*a^*b^*$ color system based on the transmitted light at each angle, and the transmitted light measurement area is set to any in-plane area of 1 mm² or more and 10 mm² or less;

<Measurement 2> the laminate 2 is produced by laminating a polarizer on a surface light source that is the same as the surface light source in the measurement 1, the polarizer is disposed so that the direction of the absorption axis of the polarizer with respect to the surface light source is the same direction as in the measurement 1, the surface light source of the laminate 2 is displayed in white, the transmitted light emitted from the polarizer side of the laminate 2 is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle, and the transmitted light measurement area substantially coincides with that in the measurement 1 in the plane; and <Condition 1> at each elevation angle and each azimuth angle, ΔL* is calculated by subtracting the L* value in the measurement 2 from the L* value in the measurement 1, values from the maximum value to the minimum value of the ΔL* are converted to grayscale to a predetermined gradation and displayed in grayscale in two-dimensional coordinates with the elevation angle as concentric circles and the azimuth angle in the vertical and horizontal directions, it is confirmed that there are two regions in which the ΔL* is concentrically distributed in the two-dimensional coordinates, and that the two regions are in substantially symmetric positions in the two-dimensional coordinates, with respect to the elevation angle located at the center of the region where the ΔL* is concentrically distributed, one elevation angle is referred to as α degree(s) and the other elevation angle is referred to as β degree(s), and the ΔEab at each azimuth angle is calculated from the differences between the L* value, the a* value, and the b* value in the measurement 1 with an azimuth angle of 0 degrees or more and 359 degrees or less at an elevation angle of (α+β)/2 and the L* value, the a* value, and the b* value in the measurement 2 with an azimuth angle of 0 degrees or more and 359 degrees or less at an elevation angle of (α+β)/2, respectively.

[2] A polarizing plate comprising a polarizer, a first transparent protective plate disposed on one side of the polarizer, and a second transparent protective plate disposed on the other side of the polarizer, wherein at least one selecting from the group consisting of the first transparent protective plate and the second transparent protective plate is the optical film according to [1].

[3] An image display device comprising a display element, and a polarizer and an optical film disposed on a light emitting surface side of the display element, wherein the optical film is the optical film according to [1], and disposition is such that the angle formed by the absorption axis of the polarizer and the slow axis of the biaxially stretched plastic film of the optical film falls within 90 degrees±5 degrees, and that the surface on the low-refractive index layer side of the optical film faces the side opposite to the display element.

[4] An image display device comprising a display element, and a polarizer and an optical film disposed on a light emitting surface side of the display element, wherein disposition is such that the angle formed by the direction of the absorption axis of the polarizer and the horizontal or vertical direction of the display element falls within ±5 degrees, and that the angle formed by the absorption axis of the polarizer and the slow axis of a biaxially stretched plastic film of the optical film falls within 90 degrees±5 degrees, and the optical film comprises a low-refractive index layer on the biaxially stretched plastic film with an in-plane phase difference of less than 2500 nm, the low-refractive index layer is located on the outermost surface of the optical film, and the optical film comprises a region in which the difference between the maximum value and the minimum value of ΔEab is less than 17.0, wherein the ΔEab is calculated as follows:

a laminate 1A is subjected to measurement 1A to calculate L* value, a* value, and b* value in the L*a*b* color system; a laminate 2A is subjected to measurement 2A to calculate L* value, a* value, and b* value in the L*a*b* color system; and based on the results of the measurement 1A and the measurement 2A, the ΔEab is calculated under condition 1A:

<Measurement 1A> the laminate 1A is produced by laminating the polarizer and the optical film on the display element in this order, in the laminate 1A, the optical film is disposed so that the surface on the low-refractive index layer side faces the side opposite to the polarizer, and the polarizer is disposed so that the angle formed by the absorption axis of the polarizer and the horizontal or vertical direction of the display element falls within ±5 degrees, and the angle formed by the absorption axis of the polarizer and the slow axis of the biaxially stretched plastic film of the optical film falls within 90 degrees±5 degrees, the display element of the laminate 1A is displayed in white, the transmitted light emitted from the low-refractive index layer side of the laminate 1A is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle, and the transmitted light measurement area is set to any in-plane area of 1 mm² or more and 10 mm² or less;

<Measurement 2A> the laminate 2A is produced by laminating the polarizer on the display element that is the same as the display element in the measurement 1A, the display element of the laminate 2A is displayed in white, the transmitted light emitted from the polarizer side of the laminate 2A is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle, and the transmitted light measurement area substantially coincides with that in the measurement 1A in the plane; and <Condition 1A> at each elevation angle and each azimuth angle, ΔL* is calculated by subtracting the L* value in the measurement 2A from the L* value in the measurement 1A, values from the maximum value to the minimum value of the ΔL* are converted to grayscale to a predetermined gradation and displayed in grayscale in two-dimensional coordinates with the elevation angle as concentric circles and the azimuth angle in the vertical and horizontal directions, it is confirmed that there are two regions in which the $\Delta L^*$ is concentrically distributed in the two-dimensional coordinates, and that the two regions are in substantially symmetric positions in the two-dimensional coordinates, with respect to the elevation angle located at the center of the region where the $\Delta L^*$ is concentrically distributed, one elevation angle is referred to as $\alpha$ degree(s) and the other elevation angle is referred to as $\beta$ degree(s), and the $\Delta Eab$ at each azimuth angle is calculated from the differences between the $L^*$ value, the $a^*$ value, and the $b^*$ value in the measurement 1A with an azimuth angle of 0 degrees or more and 359 degrees or less at an elevation angle of $(\alpha+\beta)/2$ and the $L^*$ value, the $a^*$ value, and the $b^*$ value in the measurement 2A with an azimuth angle of 0 degrees or more and 359 degrees or less at an elevation angle of $(\alpha+\beta)/2$, respectively.

[5] A method for selecting an optical film of an image display device comprising a display element, and a polarizer and an optical film on the light emitting surface of the display element, wherein disposition is such that the direction of the absorption axis of the polarizer is parallel to the horizontal or vertical direction of the display element, the method comprising selecting, as the optical film, an optical film X satisfying determination conditions that the optical film X comprises a low-refractive index layer on a biaxially stretched plastic film with an in-plane phase difference of less than 2500 nm, the low-refractive index layer is located on the outermost surface of the optical film X, and the optical film X comprises a region in which the difference between the maximum value and the minimum value of $\Delta Eab$ is less than 17.0, wherein the $\Delta Eab$ is calculated as follows:

a laminate 1B is subjected to measurement 1B to calculate $L^*$ value, $a^*$ value, and $b^*$ value in the $L^*a^*b^*$ color system, a laminate 2B is subjected to measurement 2B to calculate $L^*$ value, $a^*$ value, and $b^*$ value in the $L^*a^*b^*$ color system, and based on the results of the measurement 1B and the measurement 2B, the $\Delta Eab$ is calculated under condition 1B:
<Measurement 1B> the laminate 1B is produced by laminating the polarizer and the optical film X on the display element in this order, in the laminate 1B, the optical film is disposed so that the surface on the low-refractive index layer side faces the side opposite to the polarizer, and the polarizer is disposed so that the angle formed by the absorption axis of the polarizer and the horizontal or vertical direction of the display element falls within ±5 degrees, and the angle formed by the absorption axis of the polarizer and the slow axis of the biaxially stretched plastic film of the optical film X falls within 90 degrees±5 degrees, the display element of the laminate 1B is displayed in white, the transmitted light emitted from the low-refractive index layer side of the laminate 1B is measured at 1 degree intervals in ranges of an elevation angle of 0 degrees or more and 80 degrees or less and an azimuth angle of 0 degrees or more and 359 degrees or less, to calculate $L^*$ value, $a^*$ value, and $b^*$ value in the $L^*a^*b^*$ color system based on the transmitted light at each angle, and the transmitted light measurement area is set to any in-plane area of 1 mm$^2$ or more and 10 mm$^2$ or less;
<Measurement 2B> the laminate 2B is produced by laminating the polarizer on the display element that is the same as the display element in the measurement 1B, the display element of the laminate 2B is displayed in white, the transmitted light emitted from the polarizer side of the laminate 2B is measured at 1 degree intervals in ranges of an elevation angle of 0 degrees or more and 80 degrees or less and an azimuth angle of 0 degrees or more and 359 degrees or less, to calculate $L^*$ value, $a^*$ value, and $b^*$ value in the $L^*a^*b^*$ color system based on the transmitted light at each angle, and the transmitted light measurement area substantially coincides with that in the measurement 1B in the plane; and
<Condition 1B> at each elevation angle and each azimuth angle, $\Delta L^*$ is calculated by subtracting the $L^*$ value in the measurement 2B from the $L^*$ value in the measurement 1B, values from the maximum value to the minimum value of the $\Delta L^*$ are converted to grayscale to a predetermined gradation and displayed in grayscale in two-dimensional coordinates with the elevation angle as concentric circles and the azimuth angle in the vertical and horizontal directions, it is confirmed that there are two regions in which the $\Delta L^*$ is concentrically distributed in the two-dimensional coordinates, and that the two regions are in substantially symmetric positions in the two-dimensional coordinates, with respect to the elevation angle located at the center of the region where the $\Delta L^*$ is concentrically distributed, one elevation angle is referred to as $\alpha$ degree(s) and the other elevation angle is referred to as $\beta$ degree(s), when the $\Delta Eab$ at each azimuth angle is calculated from the differences between the $L^*$ value, the $a^*$ value, and the $b^*$ value in the measurement 1B with an azimuth angle of 0 degrees or more and 359 degrees or less at an elevation angle of $(\alpha+\beta)/2$ and the $L^*$ value, the $a^*$ value, and the $b^*$ value in the measurement 2B with an azimuth angle of 0 degrees or more and 359 degrees or less at an elevation angle of $(\alpha+\beta)/2$, respectively, the difference between the maximum value and the minimum value of $\Delta Eab$ is less than 17.0.

Advantageous Effects of Invention

The optical film of the present disclosure, and a polarizing plate and an image display device using the optical film can suppress rainbow unevenness when viewed with the naked eyes without increasing the in-plane phase difference to 3000 nm or more. Further, the method for selecting an optical film of the present disclosure enables an optical film that can suppress rainbow unevenness when viewed with the naked eyes to be efficiently selected without increasing the in-plane phase difference.

DESCRIPTION OF EMBODIMENTS

Figure 1:
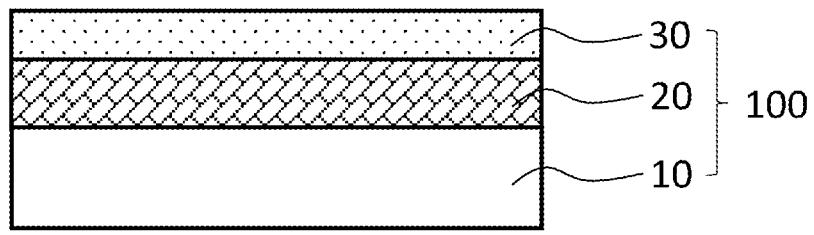
FIG. 1 is a sectional view showing one embodiment of the optical film of the present disclosure.

Hereinafter, an embodiment of the present disclosure will be described.

[Optical Film]

The optical film of present disclosure has a low-refractive index layer on a plastic film, the plastic film is a biaxially stretched plastic film with an in-plane phase difference of 2500 nm or less, the low-refractive index layer is located on the outermost surface of the optical film, and the optical film has a region in which the difference between the maximum value and the minimum value of ΔEab is less than 17.0.

Here, the ΔEab is calculated as follows: a laminate 1 is subjected to measurement 1 to calculate L* value, a* value, and b* value in the L*a*b* color system. A laminate 2 is subjected to measurement 2 to calculate L* value, a* value, and b* value in the L*a*b* color system. Based on the results of the measurement 1 and the measurement 2, the ΔEab is calculated from condition 1.

<Measurement 1>

A laminate 1 is produced by laminating a polarizer and the optical film on a surface light source in this order. In the laminate 1, the optical film is disposed so that the surface on the low-refractive index layer side faces the side opposite to the polarizer. Further, the polarizer is disposed so that the angle formed by the absorption axis of the polarizer and the horizontal or vertical direction of the surface light source falls within ±5 degrees. Further, the polarizer is disposed so that the angle formed by the absorption axis of the polarizer and the slow axis of the biaxially stretched plastic film of the optical film falls within 90 degrees±5 degrees.

The surface light source of the laminate 1 is displayed in white, and the transmitted light emitted from the low-refractive index layer side of the laminate 1 is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle. The transmitted light measurement area is set to any in-plane area of 1 mm² or more and 10 mm² or less.

<Measurement 2>

The laminate 2 is produced by laminating a polarizer on a surface light source that is the same as the surface light source in the measurement 1.

The surface light source of the laminate 2 is displayed in white, and the transmitted light emitted from the polarizer side of the laminate 2 is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle. The transmitted light measurement area substantially coincides with that in measurement 1 in the plane.

From the measurement results, the L* value, the a* value, and the b* value with an azimuth angle of 0 degrees or more and 359 degrees or less at an elevation angle of (α+β)/2 as above are each confirmed.

<Condition 1>

At each elevation angle and each azimuth angle, ΔL* is calculated by subtracting the L* value in the measurement 2 from the L* value in the measurement 1. Values from the maximum value to the minimum value of the ΔL* are converted to grayscale to a predetermined gradation and displayed in grayscale in two-dimensional coordinates with the elevation angle as concentric circles and the azimuth angle in the vertical and horizontal directions.

It is confirmed that there are two regions in which the ΔL* is concentrically distributed in the two-dimensional coordinates, and that the two regions are in substantially symmetric positions in the two-dimensional coordinates.

With respect to the elevation angle located at the center of the region where the ΔL* is concentrically distributed, one elevation angle is referred to as α degree(s) and the other elevation angle is referred to as β degree(s).

The ΔEab at each azimuth angle is calculated from the differences between the L* value, the a* value, and the b* value in the measurement 1 with an azimuth angle of 0 degrees or more and 359 degrees or less at an elevation angle of (α+β)/2 and the L* value, the a* value, and the b* value in the measurement 2 with an azimuth angle of 0 degrees or more and 359 degrees or less at an elevation angle of (α+β)/2, respectively.

In this description, the measurement 1 and the measurement 2, and the later-described measurement (such as in-plane phase difference, phase difference in the thickness direction, slow axis direction, and surface roughness of the low-refractive index layer) are performed in an atmosphere at a temperature of 23° C.±5° C. and a relative humidity of 40% RH or more and 65% RH or less, unless otherwise particularly noted. Further, the measurement sample is exposed to the atmosphere for 30 minutes or more before each measurement.

FIG. 1 is a sectional view showing an embodiment of the optical film 100 of the present disclosure. As shown in FIG. 1, the optical film 100 of the present disclosure has a low-refractive index layer 30 on a plastic film 10.

The optical film 100 of the present disclosure may have a layer other than the plastic film 10 and the low-refractive index layer 30. Examples of the layer other than the plastic film 10 and the low-refractive index layer 30 include a hard coating layer, an anti-glare layer, and a high-refractive index layer. The optical film 100 of FIG. 1 has a hard coating layer 20 between the plastic film 10 and the low-refractive index layer 30.

<<Measurement 1>>

The measurement 1 can be performed according to (1-1) to (1-2) below.

(1-1) The laminate 1 is produced by laminating a polarizer and an optical film in this order on a surface light source. In the laminate 1, the optical film is disposed so that the surface on the low-refractive index layer side faces the side opposite to the polarizer. Further, the polarizer is disposed so that the angle formed by the direction of the absorption axis of the polarizer and the horizontal or vertical direction of the surface light source falls within ±5 degrees. Further, the polarizer is disposed so that the angle formed by the absorption axis of the polarizer and the slow axis of the biaxially stretched plastic film of the optical film falls within 90 degrees±5 degrees.

Figure 2:
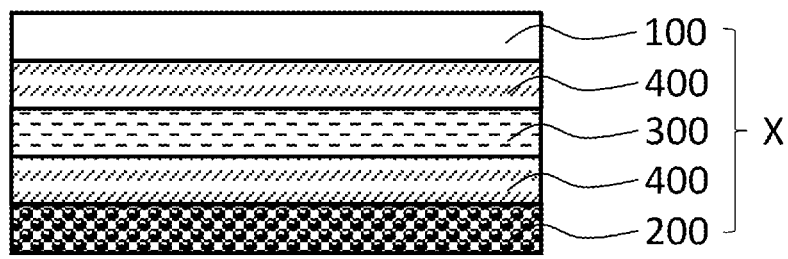
FIG. 2 is a sectional view for describing the disposition in the thickness direction of a laminate 1 used in measurement 1.

FIG. 2 is a sectional view for describing disposition in the thickness direction of the laminate 1 used in section (1-1) above.

The laminate 1 (X) in FIG. 2 is formed by laminating a surface light source 200, a polarizer 300, and the optical film 100 via adhesive layers 400. As shown in FIG. 2, a surface light source, a polarizer, and an optical film are preferably bonded via adhesive layers or the like. The aforementioned bonding is enough to be apparently bonded and may be temporary bonding via a liquid such as water and a solvent, for example. Further, the laminate 1 may have an optically isotropic film. For example, the laminate 1 may have optically isotropic films as polarizer protective films on one or both sides of the polarizer.

The adhesive layers to be used for producing the laminate 1 and the later-described the laminate 2 preferably have a refractive index of 1.42 or more and 1.53 or less and preferably has a thickness of 15 μm or more and 40 μm or less. The adhesive layers more preferably have a refractive index of 1.45 or more and 1.50 or less and more preferably have a thickness of 20 μm or more and 30 μm or less. The refractive index and the thickness of the adhesive layers falling within such ranges do not substantially affect the later-described ΔEab. In this description, the refractive index is a dimensionless parameter. The adhesive layers to be used for producing the laminate 1 and the later-described laminate 2 preferably have substantially no internal haze.

General purpose adhesive layers such as curable adhesive layers, pressure-sensitive adhesive layers and heat-sensitive adhesive layers (heat sealing layers) can be used as the adhesive layers.

In section (1-1) above, the polarizer is disposed so that the absorption axis of the polarizer is substantially parallel to the horizontal or vertical direction of the surface light source. In this description, the phrase, substantially parallel to, means that the angle formed by the absorption axis of the polarizer and the horizontal or vertical direction of the surface light source falls within ±5 degrees, preferably within ±3 degrees, further preferably within ±1 degree.

When the shape in plan view of the surface light source is rectangular or square, it is easy to certify the horizontal or vertical direction. It is not necessary to distinguish between the horizontal and vertical directions.

When the shape in plan view of the surface light source is a shape other than the rectangular or square shape (such as circles and triangles), a rectangle or square having the maximum area that does not protrude from the outer frame of the surface light source is drawn, and the horizontal or vertical direction may be certified based on the rectangular or square drawn.

In section (1-1) above, the polarizer is disposed so that the angle formed by the direction of the absorption axis of the polarizer and the horizontal or vertical direction of the surface light source falls within ±5 degrees, in consideration of the fact that the polarizers on the light emitting surface side of general purpose image display devices are disposed in such a manner.

In section (1-1) above, the absorption axis of the polarizer and the slow axis of the biaxially stretched plastic film of the optical film are disposed so as to be substantially orthogonal to each other. In this description, the phrase, substantially orthogonal to, means that the angle formed by the absorption axis of the polarizer and the slow axis of the biaxially stretched plastic film falls within 90 degrees±5 degrees, preferably within 90 degrees±3 degrees, more preferably within 90 degrees±1 degree.

The slow axis means a direction having the largest refractive index in the plane of the biaxially stretched plastic film. In the case where the slow axis direction in the plane of the biaxially stretched plastic film is not uniform, the slow axis direction of the biaxially stretched plastic film means the average slow axis direction in the plane of the biaxially stretched plastic film.

In section (1-1) above, the polarizer preferably has a polarization degree of 99.00% or more and an average transmittance of 35% or more, more preferably a polarization degree of 99.90% or more and an average transmittance of 37% or more, further preferably a polarization degree of 99.95% or more and an average transmittance of 40% or more. In this description, the average transmittance means the average of the spectral transmittance at a wavelength of 400 nm or more and 700 nm or less. The average transmittance is measured at a wavelength interval of 5 nm.

Further, the polarizer may have optically isotropic films on one or both sides thereof. Further, the polarizer and each optically isotropic film may be bonded via an adhesive layer.

The polarizer to be used in the measurement 1 and the measurement 2 may be a polarizer disposed in advance on the display element or may be a polarizer separately prepared.

In section (1-1) above, the surface light source is not specifically limited, as long as it can be displayed in white.

The light emitted from the surface light source passes through the polarizer to be linearly polarized light, and the linearly polarized light enters the optical film. The linearly polarized light entering the optical film can be regarded as light (linearly polarized light) that is emitted from a display element of a general purpose image display device and that has passed through the polarizer on the viewer side.

As the surface light source, general purpose image display devices such as liquid crystal display devices and organic EL display devices can be used, for example. However, in the case of an image display device having a polarizer on the viewer side on a display element, the image display device excluding the polarizer on the viewer side is regarded as a surface light source. This is because the polarizer on the viewer side can be the polarizer of the laminate 1 and the laminate 2. Further, in the case of the surface light source being a liquid crystal display device, examples of the backlight of the liquid crystal display device include a backlight using quantum dots and a backlight using white light emitting diodes.

A laminate formed by disposing an optical film on an image display device having a polarizer on the viewer side on a display element can be regarded as the laminate 1 to be used in the measurement 1 as long as it satisfies other conditions of the measurement 1.

Further, an image display device having a polarizer on the viewer side on a display element can be regarded as the laminate 2 to be used in the measurement 2 as long as it satisfies other conditions of the measurement 2.

(1-2) The surface light source of the laminate 1 is displayed in white, and the transmitted light emitted from the low-refractive index layer side of the laminate 1 is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle. The transmitted light measurement area is set to any in-plane area of 1 mm² or more and 10 mm² or less.

In section (1-2) above, the measurement area is set to 1 mm² or more, in consideration of the fact that, when the area is excessively small, it is difficult for humans to recognize it. Further, the measurement area is set to 10 mm² or less, in consideration of suppressing the influence of the emission angle distribution of the surface light source and the fact that, when the area is excessively large, the ΔEab is averaged, and it becomes difficult to correlate with the results by visual inspection.

The maximum value of the elevation angle is set to 80 degrees, because it is generally difficult to detect light emitted from an elevation angle of over 80 degrees since the emitted light is almost parallel to the plane.

In section (1-2) above, the measurement area is preferably set to 1 mm² or more and 5 mm² or less.

In section (1-2) above, the interval between the laminate 1 and the transmitted light measuring device is preferably over 0 mm and 1.5 mm or less, more preferably 0.5 mm or more and 1.5 mm or less, further preferably 1.0 mm. Such an interval can suppress the spread of the emitted light while suppressing the deformation of the laminate 1 due to the weight of the measuring device, so that the measurement error can be easily reduced. Likewise, the interval between the laminate 2 and the transmitted light measuring device is also preferably set to the aforementioned range in section (2-2) below.

In section (1-2) above, (2-2) below, and (3-1) to (3-4) below, the measurement and analysis can be performed, for example, by product name "EzContrast", available from ELDIM.

In this description, the L* value, the a* value, and the b* value are based on the L*a*b* color system normalized by the Commission Internationale de l'Eclairage (CIE) in 1976. The L*a*b* color system is employed in JIS Z8781-4:2013.

<<Measurement 2>>

The measurement 2 can be performed according to (2-1) to (2-2) below.

(2-1) The laminate 2 is produced by laminating a polarizer on a surface light source that is the same as the surface light source in the measurement 1. Further, the polarizer is disposed so that the direction of the absorption axis of the polarizer with respect to the surface light source is the same direction as in the measurement 1. Further, the polarizer of the measurement 2 used is the same as the polarizer of the measurement 1.

Figure 3:
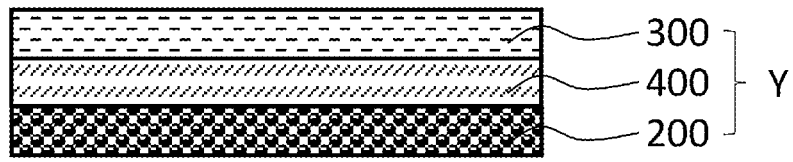
FIG. 3 is a sectional view for describing the disposition in the thickness direction of a laminate 2 used in the measurement 2.

FIG. 3 is a sectional view for describing disposition in the thickness direction of the laminate 2 used in section (2-1) above.

The laminate 2 (Y) in FIG. 3 is formed by laminating the surface light source 200 and the polarizer 300 via the adhesive layer 400. As shown in FIG. 3, the surface light source and the polarizer are preferably bonded together via an adhesive layer or the like. The aforementioned bonding is enough to be apparently bonded and may be temporary bonding via a liquid such as water and a solvent, for example.

In section (2-1) above, the polarizer is disposed so that the direction of the absorption axis of the polarizer with respect to the surface light source is the same direction as in the measurement 1. For example, in the case where the polarizer is disposed so that the direction of the absorption axis of the polarizer is parallel to the horizontal direction of the surface light source in the measurement 1, the same disposition is employed also in section (2-1) above.

(2-2) The surface light source of the laminate 2 is displayed in white, and the transmitted light emitted from the polarizer side of the laminate 2 is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle. The transmitted light measurement area substantially coincides with that in the measurement 1 in the plane.

In section (2-2) above, the phrase, the transmitted light measurement area substantially coincides with that in the measurement 1 in the plane, means that the distance between the center of the transmitted light measurement area in the measurement 1 and the center of the transmitted light measurement area in the measurement 2, when the laminate 1 and the laminate 2 are overlapped and viewed in plan view, is 0.5 mm or less, preferably 0.3 mm or less, more preferably 0.1 mm or less.

As described in section (1-1) above, the surface light source to be used in the measurement 1 and the measurement 2 is not specifically limited as long as it can be displayed in white, but a surface light source having averages of L* values, a* values, and b* values in the state of the laminate 2 as (a1) to (a3) below is preferable, for stable measurement. In other words, the averages of L* values, a* values, and b* values of the measurement 2 preferably fall within the following ranges, for stable measurement.

(a1) The average of L* values at all angles obtained in the measurement (2-2) above is 95 or more and 105 or less. The average of L* values at all angles is more preferably 95 or more and 100 or less.

(a2) The average of a* values at all angles obtained in the measurement (2-2) above is −10 or more and 10 or less. The average of a* values at all angles is more preferably −5 or more and 5 or less.

(a3) The average of b* values at all angles obtained in the measurement (2-2) above is −10 or more and 10 or less. The average of b* values at all angles is more preferably −5 or more and 5 or less.

Further, a surface light source exhibiting variations (3σ) of L* values, a* values, and b* values in the state of the laminate 2 as (b1) to (b3) below is more preferable, for more stable measurement. In other words, the variations (3σ) of L* values, a* values, and b* values of the measurement 2 preferably fall within the following ranges, for stable measurement.

(b1) The variation (3σ) of L* values at all angles obtained in the measurement (2-2) above is 120 or less. The variation (3σ) of L* values at all angles is more preferably 115 or less.

(b2) The variation (3σ) of the absolute values of a* values at all angles obtained in the measurement (2-2) above is 15 or less.

(b3) The variation (3σ) of the absolute values of b* values at all angles obtained in the measurement (2-2) above is 15 or less.

Further, the surface light source preferably satisfies the following condition A, for more facilitating suppression of rainbow unevenness. Satisfying the condition A means at least any of the full width at half maximum of the intensity peak present in each of the blue wavelength region, the green wavelength region, and the red wavelength region is a predetermined value or more (10 nm or more).

Figure 11:
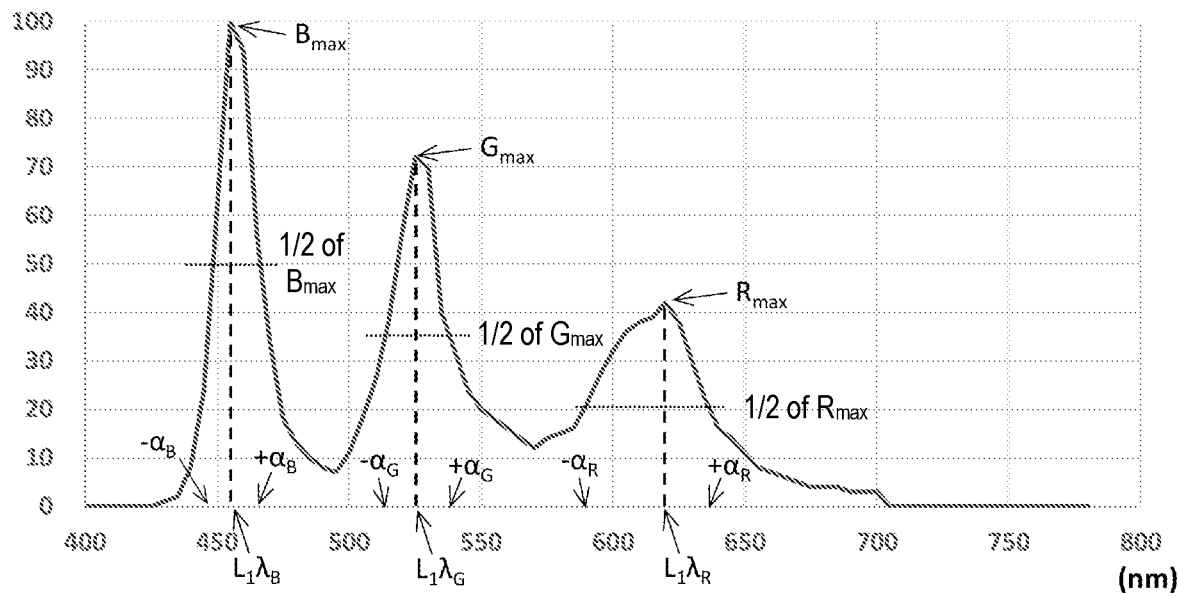
FIG. 11 is a graph for describing $[+\alpha_B-(-\alpha_B)]$, $[+\alpha_G-(-\alpha_G)]$, and $[+\alpha_R-(-\alpha_R)]$ of condition A.

FIG. 11 is a graph for describing $[+\alpha_B-(-\alpha_B)]$, $[+\alpha_G-(-\alpha_G)]$, and $[+\alpha_R-(-\alpha_R)]$ of the condition A. The spectral spectrum of FIG. 11 is a spectral spectrum of a surface light source of a general purpose organic EL device.

<Condition A>

A first polarizer is disposed on a surface light source, and the intensity of light $L_1$ emitted from the first polarizer side in the perpendicular direction is measured at 1 nm interval of wavelength. The blue wavelength region is set to 400 nm or more and less than 500 nm, the green wavelength region is set to 500 nm or more and less than 570 nm, and the red wavelength region is set to 570 nm or more and 780 nm or less. The maximum intensity of the blue wavelength region of the $L_1$ is referred to as $B_{max}$, the maximum intensity of the green wavelength region of the $L_1$ is referred to as $G_{max}$, and the maximum intensity of the red wavelength region of the $L_1$ is referred to as $R_{max}$.

The wavelength that represents $B_{max}$ is referred to as $L_1\lambda_B$, the wavelength that represents $G_{max}$ is referred to as $L_1\lambda_G$, and the wavelength that represents $R_{max}$ is referred to as $L_1\lambda_R$.

The wavelength that represents the intensity of ½ or less of $B_{max}$ and that is the minimum wavelength located on the minus side of $L_1\lambda_B$ is referred to as $-\alpha_B$, the wavelength that represents the intensity of ½ or less of $B_{max}$ and that is the minimum wavelength located on the plus side of $L_1\lambda_B$ is referred to as $+\alpha_B$, the wavelength that represents the intensity of ½ or less of $G_{max}$ and that is the maximum wavelength located on the minus side of $L_1\lambda_G$ is referred to as $-\alpha_G$, the wavelength that represents the intensity of ½ or less of $G_{max}$ and that is the minimum wavelength located on the plus side of $L_1\lambda_G$ is referred to as $+\alpha_G$, the wavelength that represents the intensity of ½ or less of $R_{max}$ and that is the maximum wavelength located on the minus side of $L_1\lambda_R$ is referred to as $-\alpha_R$, and the wavelength that represents the intensity of ½ or less of $R_{max}$ and that is the maximum wavelength located on the plus side of $L_1\lambda_R$ is referred to as $+\alpha_R$.

At least any of $[+\alpha_B-(-\alpha_B)]$, $[+\alpha_G-(-\alpha_G)]$, and $[+\alpha_R-(-\alpha_R)]$ is 10 nm or more.

In the condition A, it is more preferable that two or more of $[+\alpha B-(-\alpha B)]$, $[+\alpha G-(-\alpha G)]$, and $[+\alpha R-(-\alpha R)]$ are 10 nm or more, and it is further preferable that all of the three are 10 nm or more.

<<Condition 1>>

In the condition 1, the difference between the maximum value and the minimum value of ΔEab calculated by the following procedure is calculated based on the L* value, the a* value, and the b* value obtained in the measurement 1 and the measurement 2. The optical film of the present disclosure needs to have a region in which the difference is less than 17.0.

<Condition 1>

At each elevation angle and each azimuth angle, ΔL* is calculated by subtracting the L* value in the measurement 2 from the L* value in the measurement 1. Values from the maximum value to the minimum value of the ΔL* are converted to grayscale to a predetermined gradation and displayed in grayscale in two-dimensional coordinates with the elevation angle as concentric circles and the azimuth angle in the vertical and horizontal directions.

It is confirmed that there are two regions in which the ΔL* is concentrically distributed in the two-dimensional coordinates, and that the two regions are in substantially symmetric positions in the two-dimensional coordinates.

With respect to the elevation angle located at the center of the region where the ΔL* is concentrically distributed, one elevation angle is referred to as α degree(s) and the other elevation angle is referred to as β degree(s).

The ΔEab at each azimuth angle is calculated from the differences between the L* value, the a* value, and the b* value in the measurement 1 with an azimuth angle of 0 degrees or more and 359 degrees or less at an elevation angle of $(\alpha+\beta)/2$ and the L* value, the a* value, and the b* value in the measurement 2 with an azimuth angle of 0 degrees or more and 359 degrees or less at an elevation angle of $(\alpha+\beta)/2$, respectively.

The ΔEab is so-called color difference.

When "the L* value, the a* value, and the b* value" of the measurement 1 and the measurement 2 at a specific azimuth angle are respectively defined as "L1*, a1*, and b1*" and "L2*, a2*, and b2*", the color difference (ΔEab) at the specific azimuth angle can be represented by the following formula. <Formula representing color difference (ΔEab)>

$$\Delta Eab=\{(L1^*-L2^*)^2+(a1^*-a2^*)^2+(b1^*-b2^*)^2\}^{1/2}$$

The ΔEab in the condition 1 can be calculated by the following procedures (3-1) to (3-4) based on the L* value, the a* value, and the b* value obtained in the measurement 1 and the measurement 2. That is, the ΔEab in the condition 1 defines the color difference between the state of having the optical film and the state of not having the optical film. This is to cancel the influence of the surface light source and impart a correlation with rainbow unevenness.

Since "$(L1^{*2}+a1^{*2}+b1^{*2})^{1/2}$" can be calculated based on only the results of the measurement 1 without using the results of the measurement 2, it has no correlation with the visibility of rainbow unevenness. The reason for this is considered to be that the influence of the L* value of the surface light source is significant.

(3-1) At each elevation angle and each azimuth angle, ΔL* is calculated by subtracting the L* value in the measurement 2 from the L* value in the measurement 1. Values from the maximum value to the minimum value of the ΔL* are converted to grayscale to a predetermined gradation and displayed in grayscale in two-dimensional coordinates with the elevation angle as concentric circles and the azimuth angle in the vertical and horizontal directions.

Figure 4:
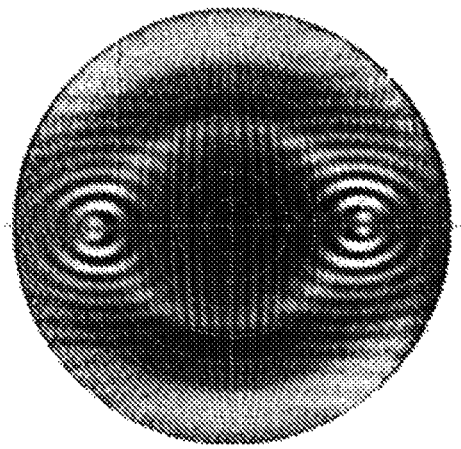
FIG. 4 is an illustration displayed in grayscale in two-dimensional coordinates with the elevation angle as concentric circles and the azimuth angle in the vertical and horizontal directions, converting to grayscale a value ($\Delta L^*$) obtained by subtracting the $L^*$ value in the measurement 2 from the $L^*$ value in measurement 1 to a predetermined gradation.

FIG. 4 is an illustration showing values from the maximum value to the minimum value of the ΔL* is converted to grayscale to a predetermined gradation and displayed in grayscale in two-dimensional coordinates with the elevation angle as concentric circles and the azimuth angle in the vertical and horizontal directions. In other words, FIG. 4 is the two-dimensional coordinates of (3-1) above.

In FIG. 4, the closer to white, the larger the ΔL* is. In FIG. 4, the center of the circular two-dimensional coordinates indicates an elevation angle of 0 degrees (perpendicular to the surface light source), and the edge indicates the maximum elevation angle. Further, in FIG. 4, the right direction from the center indicates an azimuth angle of 0 degrees, the upper direction from the center indicates an azimuth angle of 90 degrees, the left direction from the center indicates an azimuth angle of 180 degrees, and the lower direction from the center indicates an azimuth angle of 270 degrees.

The gradation of (3-1) above is generally the n-th root of 2, and examples thereof include 16, 32, 64, 128, and 256 gradations.

The two-dimensional coordinates in grayscale of (3-1) above can be plotted, for example, by product name "EzContrast" of ELDIM.

(3-2) It is confirmed that there are two regions in which the ΔL* is concentrically distributed in the two-dimensional coordinates, and that the two regions are in substantially symmetric positions in the two-dimensional coordinates.

Here, to be "in substantially symmetric positions" means that the difference between X1 and X2 is ±3 degrees or less, and the absolute value of the difference between Y1 and Y2 is 180 degrees±5 degrees or less, when the elevation angle and the azimuth angle located at the center of one region in which the ΔL* is concentrically distributed are defined as X1 and Y1, and the elevation angle and the azimuth angle located at the center of the other region in which the ΔL* is concentrically distributed are defined as X2 and Y2. The difference between X1 and X2 is preferably ±1 degree or less, and the absolute value of the difference between Y1 and Y2 is preferably 180 degrees±3 degrees or less.

In the two-dimensional coordinates shown in FIG. 4, there are two regions in which the ΔL* is concentrically distributed, and the two regions are present in substantially symmetric positions in the two-dimensional coordinates.

Such concentric circles in symmetric positions are considered to be formed by fluctuations in the reflectance of P waves and S waves due to the refractive index distribution in the measurement area (concentric circles are formed along the slow axis, due to high refractive index in the slow axis direction of the biaxially stretched plastic film; in the case of FIG. 4, the slow axis of the biaxially stretched plastic film direction is the horizontal direction of FIG. 4) and the change in optical path length of the low-refractive index layer in the measurement area (as the distance from the measurement center increases, the optical path length (the distance of transmitted light passing through the low-refractive index layer) increases). In other words, such concentric circles in symmetric positions are generally formed in an optical film having a low-refractive index layer on a biaxially stretched plastic film (measurement 1) and a simple substance of the biaxially stretched plastic film (further, as the in-plane phase difference increases, concentric circles tend to be formed in symmetric positions). Further, in the measurement 2, since either of P waves or S waves are used, concentric circles as described above are not formed. Therefore, the concentric circles formed by the L* value in the measurement 1 are maintained in the difference (ΔL*) in L* value between the measurement 1 and the measurement 2 (since the influence of the light source is canceled in the ΔL*, the fluctuations in reflectance of P waves and S waves are clearer, and the concentric circles are formed more clearly).

(3-3) With respect to the elevation angle located at the center of the region in which the ΔL* is concentrically distributed, one elevation angle is referred to as α degree(s), and the other elevation angle is referred to as β degree(s).

In section (3-3) above, the "elevation angle located at the center of the region in which the ΔL* is concentrically distributed" can be determined, for example, by displaying the two-dimensional coordinates on a software of the measuring device and selecting the center of concentrically distributed region (for example, clicking the center of the concentrically distributed region with a mouse).

(3-4) From the measurement results, the ΔEab at each azimuth angle is calculated from the differences between the L* value, the a* value, and the b* value in the measurement 1 with an azimuth angle of 0 degrees or more and 359 degrees or less at an elevation angle of (α+β)/2 and the L* value, the a* value, and the b* value in the measurement 2 with an azimuth angle of 0 degrees or more and 359 degrees or less at an elevation angle of (α+β)/2, respectively. Then, the difference between the maximum value and the minimum value of ΔEab is calculated.

In section (3-4) above, if a fraction occurs in (α+β)/2, the numerical value is rounded up. For example, in the case where α is 30 degrees, and β is 31 degrees, the ΔEab is calculated from the L* value, the a* value, and the b* value with an azimuth angle of 0 degrees or more and 359 degrees or less at an elevation angle of 31 degrees.

The value of (α+β)/2 is preferably 50 degrees or less, more preferably 40 degrees or less, further preferably 30 degrees or less. When the value of (α+β)/2 is 50 degrees or less, the value of (α+β)/2 is away from the vicinity of Brewster's angle, and thus fluctuations in reflectance of P waves and S waves at an angle around (α+β)/2 can be easily suppressed. The lower limit of (α+β)/2 is not particularly limited but is preferably 5 degrees or more, more preferably 10 degrees or more, further preferably 15 degrees or more.

The value of (α+β)/2 can be easily adjusted to such a range by decreasing the refractive index nz in the thickness direction of the biaxially stretched plastic film.

The optical film of the present disclosure needs to have the difference between the maximum value and the minimum value of ΔEab of less than 17.0, which is calculated at each azimuth angle (at 0 degrees or more and 359 degrees or less). When the difference is large, colors are strongly felt at a specific azimuth angle. Therefore, when the difference is 17.0 or more, colors are strongly felt at an azimuth angle at which the ΔEab is at maximum, and it is impossible to suppress rainbow unevenness with the naked eyes.

The difference is preferably 16.0 or less, more preferably 15.0 or less, further preferably 14.0 or less.

The lower limit of the difference is not specifically limited but is generally about 3.0.

The difference can be easily adjusted to less than 17.0, for example, by using a biaxially stretched plastic film satisfying the later-described condition 2.

The reason why the measured value of an azimuth angle of 0 degrees or more and 359 degrees or less passing through (α+β)/2 is used in condition 1 is that the bright and dark regions of the concentric circles are alternately measured in the direction passing through (α+β)/2 (see FIG. 4), and the difference between the maximum value and the minimum value of the ΔEab is theoretically largest.

Further, the present disclosure is characterized in that an azimuth angle passing through the center of concentric circles ((α+β)/2) is used instead of the Brewster angle. The concentric circles of the ΔL* are affected by the in-plane phase difference (as the in-plane phase difference increases, the concentric circles become smaller). Meanwhile, the Brewster's angle controlled by the refractive index is not affected by the in-plane phase difference. Therefore, even if the "difference between the maximum value and the minimum value of ΔEab" calculated from the measured value of the azimuth angle passing through the Brewster's angle is small, it is difficult to decrease the "difference between the maximum value and the minimum value of ΔEab" calculated from the measured value of the azimuth angle passing through (α+β)/2. That is, the present disclosure has a technical significance superior to those of Patent Literatures 2 and 3 in that it enabled suppression of visibility of rainbow unevenness by the "difference between the maximum value and the minimum value of ΔEab" calculated from the measured value of the azimuth angle passing through (α+β)/2 instead of the Brewster's angle satisfying predetermined conditions.

Further, as described later, the diagonal phase difference of a biaxially stretched plastic film satisfying the relationship of $n_x > n_y \geq n_z$ gradually decreases as it is inclined in the slow axis direction, to be 0 nm in the vicinity of "(α+β)/2". The inventors have found that color unevenness similar to rainbow unevenness is strongly felt at an elevation angle of fixed to "(α+β)/2", and colors are observed at an azimuth angle of 0 to 359 degrees. In general, rainbow unevenness is observed in a direction in which the phase difference has a predetermined value. However, the observation in directions at an azimuth angle of 0 to 359 degrees with the elevation angle fixed to "(α+β)/2" is completely different from the normal observation because the diagonal phase difference in the slow axis direction is 0 nm. Therefore, color unevenness that is visible in directions at an azimuth angle of 0 to 359 degrees with the elevation angle fixed to "(α+β)/2" may be referred to as "color distortion" in this description, in order to distinguish it from "rainbow unevenness".

In the optical film, the region in which the difference between the maximum value and the minimum value of ΔEab is less than 17.0 is preferably 50% or more, more preferably 70% or more, further preferably 90% or more, even more preferably 100%.

Likewise, the region satisfying various parameters other than the difference (such as the in-plane phase difference, the phase difference in the thickness direction, the condition 2, and the surface roughness of the low-refractive index layer) is also preferably 50% or more, more preferably 70% or more, further preferably 90% or more, even more preferably 100%, in the optical film.

The maximum value of the ΔEab calculated at each azimuth angle (0 degrees or more and 359 degrees or less) is preferably 16.0 or less, more preferably 15.0 or less, further preferably 14.0 or less. The maximum value of the ΔEab falling within such a range enables rainbow unevenness to be less visible to the naked eyes.

In the optical film of the present disclosure, (α+β)/2 and X preferably satisfy formula (A) below when the Brewster's angle to the entire visible light entering the optical film from the biaxially stretched plastic film side is defined as X degrees.

$$X-(\alpha+\beta)/2 \leq 20 \text{ degrees} \quad (A)$$

The Brewster's angle (X) can be calculated by formula (B) below from the refractive indices of two substances. In the formula, n1 represents the refractive index on the incident side, and n2 represents the refractive index on the transmission side.

$$X = \text{Arctan}(n2/n1) \quad (B)$$

The optical film of the present disclosure can exert more remarkable effects when the Brewster's angle is shifted from the center of the concentric circles ((α+β)/2). In other words, the optical film satisfying formula (A) above is preferable in that the effects of the present disclosure can be easily exerted.

X−(α+β)/2 is more preferably 30 degrees or more, further preferably 35 degrees or more. The upper limit of X−(α+β)/2 is not specifically limited but is about 40 degrees.

<Plastic Film>

The plastic film is a biaxially stretched plastic film having an in-plane phase difference of 2500 nm or less.

Use of a biaxially stretched plastic film can improve the mechanical strength. Further, setting the in-plane phase difference of the biaxially stretched plastic film to 2500 nm or less allows stretching ratios in the vertical and horizontal directions to fall within an appropriate range, so as to further improve the mechanical strength and the tear resistance. Further, setting the in-plane phase difference of the biaxially stretched plastic film to 2500 nm or less can contribute to thinning of the biaxially stretched plastic film.

The in-plane phase difference of the biaxially stretched plastic film is preferably 2000 nm or less, more preferably 1500 nm or less, more preferably 1400 nm or less, more preferably 1150 nm or less, more preferably 1000 nm or less, more preferably 600 nm or less, in order to make it easier to suppress rainbow unevenness. In the case where the thickness of the biaxially stretched plastic film is reduced to 10 μm or more and 50 μm or less, the in-plane phase difference is preferably 1400 nm or less.

When the in-plane phase difference of the biaxially stretched plastic film is excessively small, even biaxial stretching may not provide sufficient mechanical strength. Therefore, the in-plane phase difference of the biaxially stretched plastic film is preferably 20 nm or more, more preferably 100 nm or more, further preferably 300 nm or more, even more preferably 520 nm or more.

Examples of the preferable range of the in-plane phase difference of the biaxially stretched plastic film include 20 nm or more and 2000 nm or less, 20 nm or more and 1500 nm or less, 20 nm or more and 1400 nm or less, 20 nm or more and 1150 nm or less, 20 nm or more and 1000 nm or less, 20 nm or more and 600 nm or less, 100 nm or more and 2000 nm or less, 100 nm or more and 1500 nm or less, 100 nm or more and 1400 nm or less, 100 nm or more and 1150 nm or less, 100 nm or more and 1000 nm or less, 100 nm or more and 600 nm or less, 300 nm or more and 2000 nm or less, 300 nm or more and 1500 nm or less, 300 nm or more and 1400 nm or less, 300 nm or more and 1150 nm or less, 300 nm or more and 1000 nm or less, 300 nm or more and 600 nm or less, 520 nm or more and 2000 nm or less, 520 nm or more and 1500 nm or less, 520 nm or more and 1400 nm or less, 520 nm or more and 1150 nm or less, 520 nm or more and 1000 nm or less, and 520 nm or more and 600 nm or less.

The phase difference in the thickness direction (Rth) of the biaxially stretched plastic film is preferably 2000 nm or more, more preferably 3000 nm or more, further preferably 4000 nm or more. The upper limit of the Rth is about 10000 nm, preferably 8000 nm or less, more preferably 7000 nm or less. The Rth falling within such a range enables rainbow unevenness to be easily suppressed more.

Examples of the preferable range of the Rth of the biaxially stretched plastic film include 2000 nm or more and 10000 nm or less, 2000 nm or more and 8000 nm or less, 2000 nm or more and 7000 nm or less, 3000 nm or more and 10000 nm or less, 3000 nm or more and 8000 nm or less, 3000 nm or more and 7000 nm or less, 4000 nm or more and 10000 nm or less, 4000 nm or more and 8000 nm or less, and 4000 nm or more and 7000 nm or less.

In order to adjust the Rth of the biaxially stretched plastic film to such a range, it is preferable to increase the stretching ratios in the vertical and horizontal directions. Increasing the stretching ratios in the vertical and horizontal directions reduces the refractive index nz in the thickness direction of the biaxially stretched plastic film, thereby enabling the Rth to be easily increased. Further, decreasing the nz of the biaxially stretched plastic film enables the value of "(α+β)/2" to be easily reduced. When the value of "(α+β)/2" is reduced, the value of (α+β)/2 shifts away from the vicinity of the Brewster's angle, thereby enabling fluctuations in reflectances of P waves and S waves at an angle around the (α+β)/2 to be easily suppressed.

The in-plane phase difference and the phase difference in the thickness direction falling within such ranges can make the degree of stretching of the biaxially stretched plastic film close to uniform biaxiality and can improve the mechanical strength of the biaxially stretched plastic film.

The in-plane phase difference (Re) and the phase difference in the thickness direction (Rth) are represented by formulas (1) and (2) below, using the refractive index nx in the slow axis direction, which is the direction with the largest refractive index, the refractive index ny in the fast axis direction, which is a direction orthogonal to the slow axis direction, the refractive index nz in the thickness direction of the plastic film, and the thickness T of the plastic film [nm].

In this description, the in-plane phase difference and the phase difference in the thickness direction are values at a wavelength 550 nm.

$$Re = (nx - ny) \times T \text{ [nm]} \quad (1)$$

$$Rth = ((nx + ny)/2 - nz) \times T \text{ [nm]} \quad (2)$$

The slow axis direction, the in-plane phase difference, and the phase difference in the thickness direction can be measured, for example, by the product name "RETS-100" of Otsuka Electronics Co., Ltd.

When measuring the in-plane phase difference or the like, using the product name "RETS-100" of Otsuka Electronics Co., Ltd., the measurement is preferably prepared according to the following procedures (A1) to (A4).
(A1) First, the light source is turned on and left standing for 60 minutes or more, in order to stabilize the light source of RETS-100. Thereafter, the rotating-analyzer method is selected, and the θ mode (mode for measuring the angular phase difference and calculating the Rth) is selected. The selection of this θ mode allows the stage to be an inclined rotation stage.
(A2) Then, the following measurement conditions are input into RETS-100.
(Measurement conditions)
  Retardation measurement range: rotating-analyzer method
  Measurement spot diameter: φ5 mm
  Inclination angle range: 0°
  Measurement wavelength range: 400 nm or more and 800 nm or less
  Average refractive index of plastic film
  For example, in the case of a PET film, N=1.617. The average refractive index N of the plastic film can be calculated by the formula (N=(nx+ny+nz)/3) based on nx, ny, and nz.
  Thickness: thickness separately measured by SEM or optical microscope
(A3) Then, background data is obtained without installing a sample in this device. A closed system is employed as the device, and the same procedure is performed every time the light source is turned on.
(A4) Thereafter, a sample is installed on the stage in the device and measured.

Figure 7:
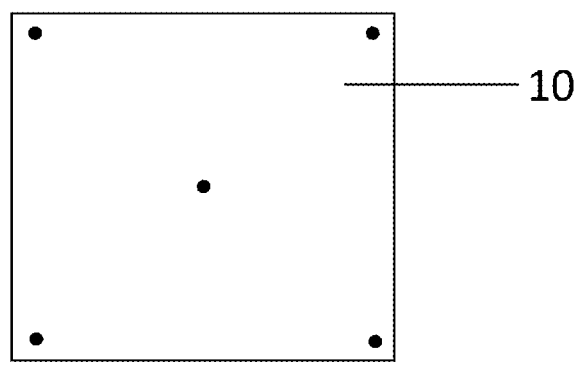
FIG. 7 is a plan view for describing the five measurement positions in a sample when calculating the in-plane phase difference or the like from the sample.

For the in-plane phase difference, the phase difference in the thickness direction, and the later-described slow axis direction, it is preferable to cut out a sample having a size of 50 mm in vertical×50 mm in horizontal from the biaxially stretched plastic film and use the average of the measured values of the sample at five points. The five measurement points are a total of five points including one point at the center and four points that are 10 mm advanced from the four corners of the sample toward the center (five black dot points in FIG. 7).

The biaxially stretched plastic film preferably has an in-plane phase difference to the phase difference in the thickness direction (in-plane phase difference/phase difference in the thickness direction) of 0.10 or less. In this description, the in-plane phase difference to the phase difference in the thickness direction may be expressed as "Re/Rth". The Re/Rth can be measured, for example, as follows.

The in-plane phase differences measured at five points of the sample are respectively defined as Re1, Re2, Re3, Re4, and Re5, and the phase differences in the thickness direction measured at five points of the sample are respectively defined as Rth1, Rth2, Rth3, Rth4, and Rth5.

The biaxially stretched plastic film preferably has an average of Re1/Rth1, Re2/Rth2, Re3/Rth3, Re4/Rth4, and Re5/Rth5 of 0.10 or less.

A small ratio of the in-plane phase difference to the phase difference in the thickness direction (Re/Rth) means that biaxial stretching of the biaxially stretched plastic film is close to uniform biaxiality. Accordingly, setting the Re/Rth to 0.10 or less can improve the mechanical strength of the biaxially stretched plastic film. The Re/Rth is more preferably 0.07 or less, further preferably 0.05 or less. The lower limit of Re/Rth is about 0.01.

The Re/Rth of a completely uniaxially stretched plastic film is 2.0. A general purpose uniaxially stretched plastic film is slightly stretched also in the flow direction. Therefore, the Re/Rth of a general purpose uniaxially stretched plastic film is about 1.0.

The Re1/Rth1, Re2/Rth2, Re3/Rth3, Re4/Rth4, and Re5/Rth5 are each preferably 0.10 or less, more preferably 0.07 or less, further preferably 0.05 or less. The lower limit of these ratios is about 0.01.

The biaxially stretched plastic film preferably satisfies the following condition 2.
<Condition 2>

The slow axis direction is measured at five points of the sample. When the angles formed by any side of the sample with the slow axis direction at the measurement points are respectively defined as D1, D2, D3, D4, and D5, the difference between the maximum value of D1 to D5 and the minimum value of D1 to D5 is 5.0 degrees or more.

When the slow axis of the biaxially stretched plastic film is well oriented, rainbow unevenness tends to be easily visible. Meanwhile, when the slow axis of the biaxially stretched plastic film varies, rainbow unevenness is blurred and difficult to see. Therefore, satisfying the condition 2 enables rainbow unevenness when viewed with the naked eyes to be easily suppressed. In other words, satisfying the condition 2 can make it easy to satisfy the difference between the maximum value and the minimum value of ΔEab of less than 17.0.

A general purpose stretched plastic film is designed so that the slow axis direction is not shifted. However, it is possible to easily suppress rainbow unevenness by intentionally shifting the slow axis direction of the plastic film, as described above. Further, although the effect of suppressing rainbow unevenness is small even if the slow axis varies in a large area, the slow axis varies in a comparatively small area of 50 mm in vertical×50 mm in horizontal, thereby enabling rainbow unevenness to be easily suppressed.

In the condition 2, the side of the sample to serve as the reference of the angle formed with the slow axis direction may be any of the vertical and horizontal sides of the sample, as long as all of D1 to D5 use the same side as the reference.

Further, satisfying the condition 2 is preferable in that it can improve the folding resistance of the biaxially stretched plastic film.

Meanwhile, a general purpose orientation film with the slow axis aligned without satisfying the condition 2 may break or have folding habits strongly remaining after a folding test. Specifically, the uniaxially stretched film as disclosed in Patent Literature 1 breaks in the case of performing a folding test along the slow axis, whereas it has folding habits strongly remaining in the case of performing a folding test in a direction orthogonal to the slow axis. Further, a general purpose biaxially stretched film has folding habits strongly remaining in the case of performing a folding test in a direction orthogonal to the slow axis.

The biaxially stretched plastic film satisfying the condition 2 is preferable in that it can suppress the folding habit remaining or breakage after the folding test, regardless of the folding direction.

The difference between the maximum value of D1 to D5 and the minimum value of D1 to D5 is preferably 6.0 degrees or more, more preferably 8.0 degrees or more, further preferably 10.0 degrees or more.

When the difference between the maximum value of D1 to D5 and the minimum value of D1 to D5 is excessively large, the orientation of the plastic film tends to be low, and the mechanical strength tends to decrease. Therefore, the difference is preferably 20.0 degrees or less, more preferably 17.0 degrees or less, further preferably 15.0 degrees or less.

In the condition 2, examples of the preferable range of the difference between the maximum value and the minimum value of D1 to D5 include 5.0 degrees or more and 20.0 degrees or less, 6.0 degrees or more and 20.0 degrees or less, 8.0 degrees or more and 20.0 degrees or less, 10.0 degrees or more and 20.0 degrees or less, 5.0 degrees or more and 17.0 degrees or less, 6.0 degrees or more and 17.0 degrees or less, 8.0 degrees or more and 17.0 degrees or less, 10.0 degrees or more and 17.0 degrees or less, 5.0 degrees or more and 15.0 degrees or less, 6.0 degrees or more and 15.0 degrees or less, 8.0 degrees or more and 15.0 degrees or less, and 10.0 degrees or more and 15.0 degrees or less.

D1 to D5 of the biaxially stretched plastic film are each preferably 5 degrees or more and 30 degrees or less or 60 degrees or more and 85 degrees or less, more preferably 7 degrees or more and 25 degrees or less or 65 degrees or more and 83 degrees or less, further preferably 10 degrees or more and 23 degrees or less or 67 degrees or more and 80 degrees or less.

Setting each of D1 to D5 to 5 degrees or more or 85 degrees or less enables blackout when viewed with polarized sunglasses to be easily suppressed. Further, setting each of D1 to D5 to 30 degrees or less or 60 degrees or more enables the decrease of the mechanical strength due to low orientation of the plastic film to be easily suppressed.

The biaxially stretched plastic film may be, for example, in the form of a sheet or a roll. In either case, the sample with a size of 50 mm in vertical×50 mm in horizonal is cut out from any place of the plastic film, but the sample is cut out along the vertical and horizontal directions confirmed in the case where the vertical and horizontal directions of the sheet and the roll can be confirmed. For example, in the case of a roll, the flow direction (MD direction) of the roll can be regarded as the vertical direction, and the width direction (TD direction) of the roll can be regarded as the horizontal direction. Further, in the case where the flow and width directions of the sheet can be confirmed, the flow direction can be regarded as the vertical direction, and the width direction can be regarded as the horizontal direction. In the case where it is difficult to confirm the flow and width directions of the sheet, and the sheet is rectangular or square, the vertical and horizontal directions may be confirmed based on the four sides constituting the rectangle or square. In the case where it is difficult to confirm the flow and width directions of the sheet, and the sheet has a shape other than the rectangular or square shape (such as circles and triangles), a rectangle or square having the maximum area that does not protrude from the outer frame of the sheet is drawn, and the horizontal and vertical directions may be confirmed based on the sides of the rectangular or square drawn.

In the case where a plurality of samples with a size of 50 mm in vertical×50 mm in horizonal can be collected from a sheet-like plastic film, the ratio of samples satisfying the condition 2 out of the plurality of samples is preferably 50% or more, more preferably 70% or more, further preferably 90% or more, even more preferably 100%. The same applies to the in-plane phase difference, the phase difference in the thickness direction, and the Re/Rth.

The biaxially stretched plastic film preferably does not crack or break after 100,000 times of the folding test shown in Examples (more preferably after 300,000 times of the test). Further, after 100,000 times of the folding test shown in Examples (more preferably after 300,000 times of the test) when the measurement sample is placed on a horizontal table, the biaxially stretched plastic film preferably has an angle at which the edge of the sample rises from the table of 20 degrees or less, more preferably 15 degrees or less. The angle at which the edge of the sample rises of 15 degrees or less means that it is difficult to have a habit due to folding. Further, for both the average of the slow axis directions and the average of the fast axis directions of the biaxially stretched plastic film, the biaxially stretched plastic film preferably exhibits the aforementioned results (it does not crack or break, has no habit due to folding, and has an angle at which the edge of the sample rises after the test of 20 degrees or less).

A uniaxially stretched plastic film breaks in the stretching direction when performing the folding test and has folding habits strongly remaining in a direction orthogonal to the stretching direction.

<<Specific Composition of Biaxially Stretched Plastic Film>>

Examples of the laminated structure of the biaxially stretched plastic film include a single-layer structure and a multilayer structure. Among them, the single-layer structure is preferable.

The biaxially stretched plastic film preferably has a decreased in-plane phase difference, in order to improve the mechanical strength and suppress rainbow unevenness. Then, in order to decrease the in-plane phase difference of the stretched plastic film, it is important to control stretching finely, such as making the stretching in the vertical and horizontal directions close to uniform. For fine stretching control, fine stretching control is difficult in a multilayer structure due to differences in physical properties of each layer, whereas fine stretching control is easy in a single-layer structure, which is preferable.

Examples of the resin component constituting the biaxially stretched plastic film include polyester, polyimide, polyethersulfone, polysulfone, polypropylene, polymethylpentene, polyvinyl chloride, polyvinyl acetal, polyether ketone, polymethylmethacrylate, polycarbonate, polyurethane, and amorphous olefin (Cyclo-Olefin-Polymer: COP). Among these, polyester is preferable in that it tends to improve the mechanical strength. That is, the biaxially stretched plastic film is preferably a polyester film, more preferably a biaxially stretched polyethylene terephthalate film.

Further, the biaxially stretched plastic film preferably satisfies the relationship of $n_x > n_y \geq n_z$, in order to improve the mechanical strength. In order to satisfy the relationship of $n_x > n_y \geq n_z$, the resin component constituting the biaxially stretched plastic film is preferably a positive birefringence material.

The diagonal phase difference of the biaxially stretched plastic film satisfying the relationship of $n_x>n_y \geq n_z$ gradually decreases as it is inclined in the slow axis direction, to be 0 nm in the vicinity of "$(\alpha+\beta)/2$". As described above, the "color distortion" tends to be strongly felt when the elevation angle along the slow axis is "$(\alpha+\beta)/2$" with a diagonal phase difference of 0 nm. In the present disclosure, color distortion can be easily suppressed by setting the difference between the maximum value and the minimum value of ΔEab to less than 17.0, even with a biaxially stretched plastic film satisfying the relationship of $n_x>n_y \geq n_z$ that tends to cause color distortion.

Examples of the positive birefringence index material include polyesters, polycarbonates, cycloolefin polymers, polyimide films, and polyamides.

Examples of the polyesters constituting the biaxially stretched polyester film include polyethylene terephthalate (PET), polyethylene naphthalate (PEN), and polybutylene terephthalate (PBT). Among these, PET is preferable in that it has low intrinsic birefringence, and thus the in-plane phase difference is easily reduced.

The biaxially stretched plastic film may contain additives such as ultraviolet absorbers, light stabilizers, antioxidants, antistatic agents, flame retardants, gelation inhibitors, and surfactants.

The lower limit of the thickness of the biaxially stretched plastic film is preferably 10 μm or more, more preferably 15 μm or more, more preferably 20 μm or more, more preferably 25 μm or more, more preferably 30 μm or more, and the upper limit thereof is preferably 200 μm or less, more preferably 180 μm or less, more preferably 150 μm or less, more preferably 100 μm or less, more preferably 80 μm or less, more preferably 60 μm or less, more preferably 50 μm or less. For thinning, the thickness of the biaxially stretched plastic film is preferably 50 μm or less.

The thickness of 10 μm or more enables the mechanical strength to be easily improved. Further, the thickness of 200 μm or less enables the in-plane phase difference to be easily adjusted to 2500 nm or less.

Examples of the preferable range of the thickness of the biaxially stretched plastic film include 10 μm or more and 200 μm or less, 15 μm or more and 200 μm or less, 20 μm or more and 200 μm or less, 25 μm or more and 200 μm or less, 30 μm or more and 200 μm or less, 10 μm or more and 180 μm or less, 15 μm or more and 180 μm or less, 20 μm or more and 180 μm or less, 25 μm or more and 180 μm or less, 30 μm or more and 180 μm or less, 10 μm or more and 150 μm or less, 15 μm or more and 150 μm or less, 20 μm or more and 150 μm or less, 25 μm or more and 150 μm or less, 30 μm or more and 150 μm or less, 10 μm or more and 100 μm or less, 15 μm or more and 100 μm or less, 20 μm or more and 100 μm or less, 25 μm or more and 100 μm or less, 30 μm or more and 100 μm or less, 10 μm or more and 80 μm or less, 15 μm or more and 80 μm or less, 20 μm or more and 80 μm or less, 25 μm or more and 80 μm or less, 30 μm or more and 80 μm or less, 10 μm or more and 60 μm or less, 15 μm or more and 60 μm or less, 20 μm or more and 60 μm or less, 25 μm or more and 60 μm or less, 30 μm or more and 60 μm or less, 10 μm or more and 50 μm or less, 15 μm or more and 50 μm or less, 20 μm or more and 50 μm or less, 25 μm or more and 50 μm or less, and 30 μm or more and 50 μm or less.

The biaxially stretched plastic film preferably has a haze according to JIS K7136:2000 of 3.0% or less, more preferably 2.0% or less, further preferably 1.5% or less, even more preferably 1.0% or less.

Further, the biaxially stretched plastic film preferably has a total light transmittance according to JIS K7361-1:1997 of 80% or more, more preferably 85% or more, further preferably 90% or more.

The biaxially stretched plastic film can be obtained by stretching a resin layer containing the components constituting the plastic film. Examples of the stretching technique include sequential biaxial stretching and simultaneous biaxial stretching.

—Sequential Biaxial Stretching—

In sequential biaxial stretching, a casting film is stretched in the flow direction, and then the film is stretched in the width direction.

The stretching in the flow direction is generally performed by the difference in peripheral speed of a pair of stretching rolls. The stretching in the flow direction may be performed in one step or may be performed in multiple steps using a plurality of stretching roll pairs. In order to suppress excessive variations in optical properties such as in-plane phase difference, it is preferable to bring a plurality of nip rolls close to the stretching rolls. The stretching ratio in the flow direction is generally twice or more and 15 times or less and is preferably twice or more and 7 times or less, more preferably 3 times or more and 5 times or less, further preferably 3 times or more and 4 times or less, in order to suppress excessive variations in optical properties such as in-plane phase difference.

The stretching temperature is preferably the glass transition temperature of the resin or more and the glass transition temperature+100° C. or less, in order to suppress excessive variations in optical properties such as in-plane phase difference. In the case of PET, 70° C. or more and 120° C. or less is preferable, 80° C. or more and 110° C. or less is more preferable, and 95° C. or more and 110° C. or less is further preferable.

For the stretching temperature, the average of the in-plane phase difference tends to be small by reducing the stretching section at low temperature, for example, by rapidly raising the temperature of the film.

Meanwhile, by increasing length of the stretching section of low temperature by means of such as slowly raising the temperature of the film, the orientation of the film increasing, thereby the average of the in-plane phase difference tends to be large, and the variation of the slow axis tends to be small.

It is preferable to use a heater that generates a turbulent flow during heating in stretching. A temperature difference occurs in a minute area in the plane of the film by heating with a wind containing a turbulent flow, and the temperature difference causes a minute shift in the orientation axis, thereby enabling the condition 2 to be easily satisfied. Further, the plastic film satisfying the condition 2 can enable the difference between the maximum value and the minimum value of ΔEab to be easily adjusted to less than 17.0.

The film stretched in the flow direction may be provided with functions such as easy slipperiness, easy adhesion, and antistatic properties by in-line coating. Further, surface treatment such as corona treatment, frame treatment, and plasma treatment may be applied before in-line coating, as required.

The coating film thus formed by in-line coating is extremely thin with a thickness of 10 nm or more and 2000 nm or less (the coating film is further thinly stretched by the stretched treatment). In this description, such thin layers are not counted as the layers constituting the plastic film.

The stretching in the width direction is generally performed with tentering by transporting the film while gripping both ends of the film with clips. The stretching ratio in the width direction is generally twice or more and 15 times or less and is preferably twice or more and 5 times or less more preferably 3 times or more and 5 times or less, further preferably 3 times or more and 4.5 times or less, in order to suppress excessive variations in optical properties such as in-plane phase difference. Further, it is preferable to set the width stretching ratio to be higher than the longitudinal stretching ratio.

The stretching temperature is preferably the glass transition temperature of the resin or more and the glass transition temperature+120° C. or less and preferably increases from the upstream to the downstream. Specifically, in the case of dividing the transverse stretching section into two, the temperature difference between the upstream and the downstream is preferably 20° C. or more, more preferably 30° C. or more, further preferably 35° C. or more, even more preferably 40° C. or more. Further, in the case of PET, the stretching temperature at the first stage is preferably 80° C. or more and 120° C. or less, more preferably 90° C. or more and 110° C. or less, further preferably 95° C. or more and 105° C. or less.

The plastic film sequentially biaxially stretched as above is preferably subjected to heating in a tenter at the stretching temperature or higher and lower than the melting point, in order to provide flatness and dimensional stability. Specifically, in the case of PET, heat setting within the range of 150° C. or more and 255° C. or less is preferably performed, more preferably 200° C. or more and 250° C. or less. Further, additional stretching of 1% or more and 10% or less is preferably performed in the first half of the heating, in order to suppress excessive variations in optical properties such as in-plane phase difference.

After heating, the plastic film is slowly cooled to room temperature and then wound up. Further, in heating and slowly cooling, relaxation treatment or the like may be used in combination, as required. The relaxation rate during heating is preferably 0.5% or more and 5% or less, more preferably 0.5% or more and 3% or less, further preferably 0.8% or more and 2.5% or less, even more preferably 1% or more and 2% or less, in order to suppress excessive variations in optical properties such as in-plane phase difference. Further, the relaxation rate during slow cooling is preferably 0.5% or more and 3% or less, more preferably 0.5% or more and 2% or less, further preferably 0.5% or more and 1.5% or less, even more preferably 0.5% or more and 1.0% or less, in order to suppress excessive variations in optical properties such as in-plane phase difference. The temperature during slow cooling is preferably 80° C. or more and 150° C. or less, more preferably 90° C. or more and 130° C. or less, further preferably 100° C. or more and 130° C. or less, even more preferably 100° C. or more and 120° C. or less, in order to improve flatness.

—Simultaneous Biaxial Stretching—

In simultaneous biaxial stretching, a casting film is guided to a simultaneous biaxial tenter and transported while gripping both ends of the film with clips, so as to be stretched simultaneously and/or stepwise in the flow and width directions. Examples of the simultaneous biaxial stretching machine include pantagraph-type, screw-type, drive motor-type, and linear motor-type. A drive motor-type or linear motor-type machine is preferable since the stretching ratio can be changed arbitrarily, and the relaxation treatment can be performed at any place.

The magnification of simultaneous biaxial stretching is generally 6 times or more and 50 times or less in terms of area magnification. The area magnification is preferably 8 times or more and 30 times or less, more preferably 9 times or more and 25 times or less, further preferably 9 times or more and 20 times or less, even more preferably 10 times or more and 15 times or less, in order to suppress excessive variations in optical properties such as in-plane phase difference. In simultaneous biaxial stretching, the stretching ratio in the flow direction and the stretching ratio in the width direction are preferably adjusted within the range of twice or more and 15 times or less, so that the aforementioned area magnification is achieved.

Further, in the case of simultaneous biaxial stretching, the stretching ratios in the flow and width directions are preferably almost the same, and the stretching speed in the flow and width directions are also preferably almost the same, in order to suppress the difference in orientation in the plane.

The stretching temperature in simultaneous biaxial stretching is preferably the glass transition temperature of the resin or more and the glass transition temperature+120° C. or less, in order to suppress excessive variations in optical properties such as in-plane phase difference. In the case of PET, the temperature is preferably 80° C. or more and 160° C. or less, more preferably 90° C. or more and 150° C. or less, further preferably 100° C. or more and 140° C. or less.

The film simultaneously biaxially stretched is preferably subjected to heating subsequently in a heat setting chamber of the tenter at the stretching temperature or higher and lower than the melting point, in order to provide flatness and dimensional stability. The heating conditions are the same as the heating conditions after sequential biaxial stretching.

<Low-Refractive Index Layer>

The low-refractive index layer has roles of enhancing the anti-reflection properties of the optical film and enabling rainbow unevenness when viewed with the naked eyes to be easily suppressed.

Although the light directed toward the viewer from the inside of the image display device is linearly polarized light when it passes through the polarizer, the polarization state of the linearly polarized light is disturbed after passing through the biaxially stretched plastic film, to be light having P waves and S waves mixed. Then, there is a difference in reflectance between P waves and S waves, and the reflectance difference is dependent on the wavelength. Therefore, it is considered that rainbow unevenness is visible to the naked eyes. Here, in the case of having a low-refractive index layer on the biaxially stretched plastic film, it is considered that the aforementioned reflectance difference can be decreased, thereby enabling rainbow unevenness to be easily suppressed. However, it is difficult to adjust the difference between the maximum value and the minimum value of ΔEab to such a range simply by forming a low-refractive index layer on a general purpose biaxially stretched plastic film, and it can not be suppress rainbow unevenness at high level. In order to easily adjust the difference between the maximum value and the minimum value of ΔEab to such a range, it is suitable to impart a variation in the orientation of the slow axis of the biaxially stretched plastic film, as described above.

It is preferable to form the low-refractive index layer on the side farthest from the biaxially stretched plastic film of the optical film. The anti-reflection properties can be more enhanced by forming the later-described high-refractive index layer adjacent to the low-refractive index layer on the biaxially stretched plastic film side of the low-refractive index layer, thereby enabling rainbow unevenness to be suppressed more easily.

The refractive index of the low-refractive index layer is preferably 1.10 or more and 1.48 or less, more preferably 1.20 or more and 1.45 or less, more preferably 1.26 or more and 1.40 or less, more preferably 1.28 or more and 1.38 or less, preferably 1.30 or more and 1.32 or less.

Further, the thickness of the low-refractive index layer is preferably 80 nm or more and 120 nm or less, more preferably 85 nm or more and 110 nm or less, more preferably 90 nm or more and 105 nm or less. Further, the thickness of the low-refractive index layer is preferably larger than the average particle size of low-refractive index particles such as hollow particles.

The techniques for forming low-refractive index layers can be roughly classified into the wet methods and the dry methods. Examples of the wet methods include a formation technique by a sol-gel method using a metal alkoxide and the like, a formation technique by applying a resin having a low refractive index such as a fluorocarbon polymer, a formation technique by applying a coating solution for forming low-refractive index layers including a resin composition and low-refractive index particles. Examples of the dry methods include a formation technique of selecting particles having a desired refractive index out of the later-described low-refractive index particles and forming the low-refractive index layer by physical vapor deposition or chemical vapor deposition.

The wet methods are superior to the dry methods in production efficiency, suppression of diagonally reflected hue, and chemical resistance. Among the examples of the wet methods, it is preferable to form the low-refractive index layer by the coating solution for forming low-refractive index layers including a binder resin composition and low-refractive index particles, for adhesion, water resistance, scratch resistance, and low refractive index.

The low-refractive index layer is generally located on the outermost surface of the optical film. Therefore, the low-refractive index layer is required to have good scratch resistance, and a general purpose low-refractive index layer is also designed to have a predetermined scratch resistance.

In recent years, hollow particles having a large particle size have been used as the low-refractive index particles, in order to decrease the refractive index of the low-refractive index layer. The inventors have found a problem that, even if the surface of a low-refractive index layer containing hollow particles having a large particle size is rubbed with those to which only fine solid matter (for example, sand) is attached or those to which only oil is attached, scratches are not visible, but if the surface is rubbed with those to which both solid matter and oil are attached, scratches are visible (resistance to this problem may be hereinafter referred to as "oil dust resistance"). The rubbing operation with those to which solid matter and oil are attached, for example, corresponds to an operation of a user operating a touch panel of an image display device with a finger to which oil contained in cosmetics, foods, or the like, and sand contained in the atmosphere are attached.

Improving the oil dust resistance of the low-refractive index layer is preferable in that it leads to the ability to maintain the effect of suppressing rainbow unevenness over a long time period.

As a result of studies, the inventors have found that the aforementioned scratches are mainly caused by chipping of some of hollow particles contained in the low-refractive index layer or dropping of the hollow particles. It is considered that this is due to large projections and recesses caused by the hollow particles formed on the surface of the low-refractive index layer. That is, when the surface of the low-refractive index layer is rubbed with a finger to which solid matter and oil are attached, the finger moves on the surface of the low-refractive index layer with the oil serving as a binder and the solid matter attached to the finger. At this time, it is considered that a phenomenon in which a part of the solid matter (for example, a pointed part of sand) enters recesses on the surface of the low-refractive index layer and a phenomenon in which the solid matter that has entered the recesses moves over the projections (hollow particles) through the recesses together with the finger tend to occur, and hollow particles are damaged or drop out due to a large force applied to the projections (hollow particles) at that time. Further, it is considered that the resin itself located in the recesses also scratched due to the friction by the solid matter, and hollow particles drop out more easily due to the damage of the resin.

Figure 8:
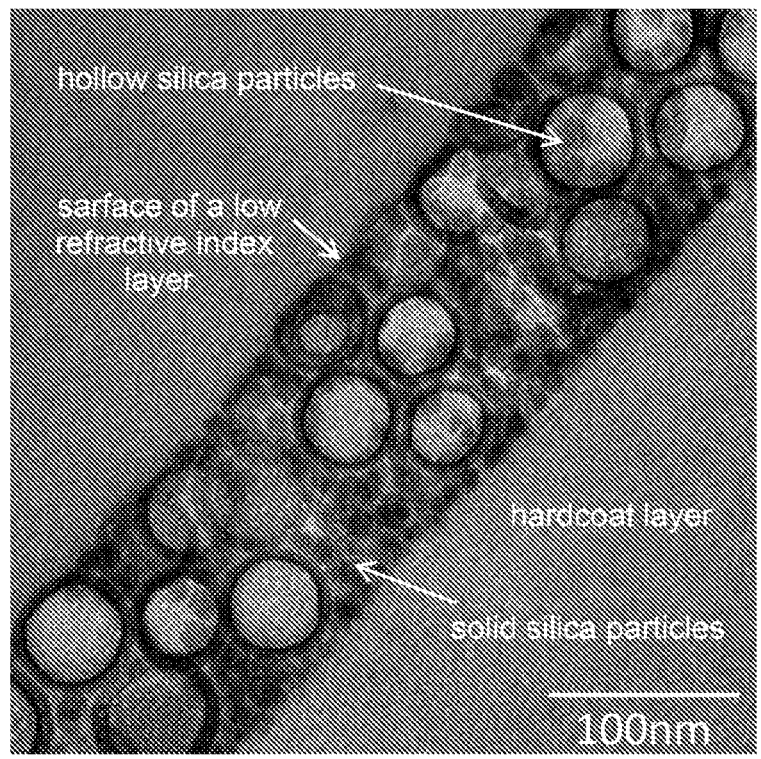
FIG. 8 is an image of the cross section of an example of a low-refractive index layer in which hollow particles and non-hollow particles are uniformly dispersed.
Figure 9:
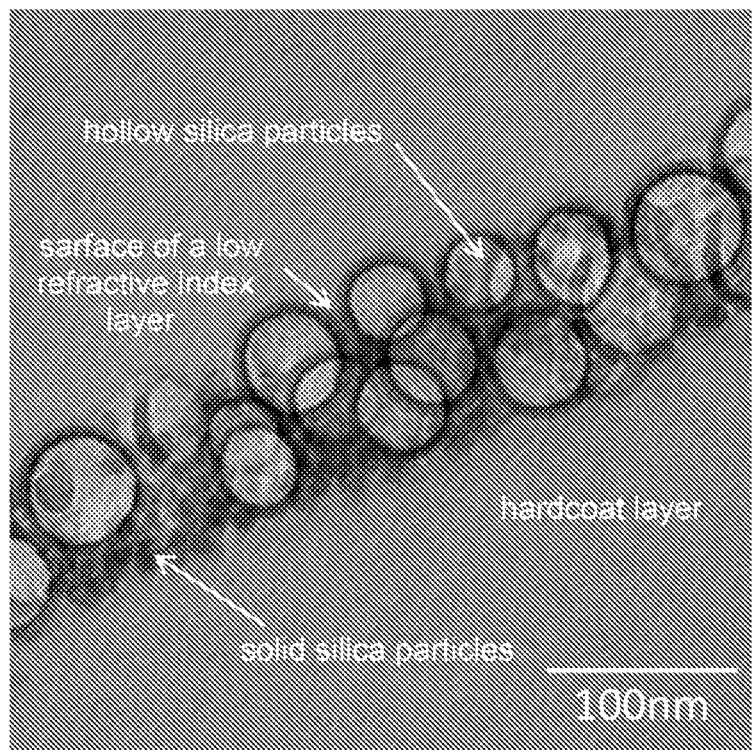
FIG. 9 is an image of the cross section of an example of a low-refractive index layer in which hollow particles and non-hollow particles are not uniformly dispersed.

As a result of diligent studies, the inventors have found that it is effective for imparting oil dust resistance to use hollow particles and non-hollow particles in combination as low-refractive index particles and uniformly disperse the hollow particles and the non-hollow particles. FIG. 8 shows a cross-sectional image of a low-refractive index layer in which hollow particles and non-hollow particles are uniformly dispersed, and FIG. 9 shows a cross-sectional image of a low-refractive index layer in which hollow particles and non-hollow particles are not uniformly dispersed. The cross-sectional images of FIG. 8 and FIG. 9 are obtained by observation using an electron microscope "product number: H-7650" of Hitachi High-Tech Corporation with conditions of an emission current of 10 μA, an acceleration voltage of 100 keV, and a filament voltage of 20 V.

The low-refractive index particles preferably contain hollow particles and non-hollow particles, in order to improve the oil dust resistance.

The materials of the hollow particles and the non-hollow particles may be any of an inorganic compound such as silica and magnesium fluoride and an organic compound but are preferably silica for low refractive index and strength. Hereinafter, hollow silica particles and non-hollow silica particles will be mainly described.

The hollow silica particles refer to particles each having an outer shell layer made of silica, with the inside of the particle surrounded by the outer shell layer being a cavity and the inside of the cavity containing air. The hollow silica particles are particles having a refractive index decreasing in proportion to the gas occupancy as compared with the original refractive index of silica by containing air. The non-hollow silica particles are particles the inside of which is not hollow like hollow silica particles. The non-hollow silica particles are, for example, solid silica particles.

The shapes of the hollow silica particles and the non-hollow silica particles are not specifically limited and may be a true sphere, a spheroid, or a substantially spherical shape such as a polyhedral shape that can be approximated to a sphere. Among these, a true sphere, a spheroid, or a substantially spherical shape is preferable, in consideration of the scratch resistance.

The hollow silica particles contain air inside and thus play a role in decreasing the refractive index of the entire low-refractive index layer. Use of hollow silica particles with an increased proportion of air and a large particle size can decrease the refractive index of the low-refractive index layer more. Meanwhile, the hollow silica particles tend to have poor mechanical strength. In particular, use of hollow silica particles with an increased proportion of air and a large particle size tends to decrease the scratch resistance of the low-refractive index layer.

The non-hollow silica particles play a role of improving the scratch resistance of the low-refractive index layer by being dispersed in the binder resin.

It is preferable to set the average particle sizes of the hollow silica particles and the non-hollow silica particles, so that the hollow silica particles are closely spaced, and further the non-hollow particles can enter between the hollow silica particles, in order to uniformly disperse the particles in the resin in the film-thickness direction while containing the hollow silica particles and the non-hollow silica particles in the binder resin at high concentration. Specifically, the ratio of the average particle size of the non-hollow silica particles to the average particle size of the hollow silica particles (average particle size of non-hollow silica particles/average particle size of hollow silica particles) is preferably 0.29 or less, more preferably 0.27 or less. Further, the ratio of the average particle size is preferably 0.05 or more, more preferably 0.10 or more.

The average particle size of the hollow silica particles is preferably 20 nm or more and 100 nm or less, in consideration of the optical properties and the mechanical strength. Since it is easy to decrease the refractive index of the entire low-refractive index layer, the average particle size of the hollow silica particles is more preferably 50 nm or more and 100 nm or less, further preferably 60 nm or more and 80 nm or less. Further, the average particle size of the non-hollow silica particles is preferably 5 nm or more and 20 nm or less, more preferably 10 nm or more and 15 nm or less, in consideration of the dispersibility while preventing the aggregation of the non-hollow silica particles.

The surface of the hollow silica particles and the non-hollow silica particles is preferably coated with a silane coupling agent. It is more preferable to use a silane coupling agent having a (meth)acryloyl group or an epoxy group.

Applying a surface treatment to the silica particles with a silane coupling agent improves the affinity of the silica particles with the binder resin and makes it difficult for the silica particles to aggregate. Therefore, the dispersion of the silica particles tends to be uniform.

Examples of the silane coupling agent include 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene) propylamine, N-phenyl-3-aminopropyltrimethoxysilane, tris-(trimethoxysilylpropyl)isocyanurate, 3-mercaptopropylmethyldimethoxysilane, 3-mercaptopropyltrimethoxysilane, 3-isocyanatepropyltriethoxysilane, methyltrimethoxysilane, dimethyldimethoxysilane, phenyltrimethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, octyltriethoxysilane, decyltrimethoxysilane, 1,6-bis(trimethoxysilyl)hexane, trifluoropropyltrimethoxysilane, vinyltrimethoxysilane, and vinyltriethoxysilane. In particular, it is preferable to use one or more selected from 3-methacryloxypropylmethyldimethoxysilane, 3-methacryloxypropyltrimethoxysilane, 3-methacryloxypropylmethyldiethoxysilane, and 3-methacryloxypropyltriethoxysilane.

As the content of the hollow silica particles increases, the filling rate of the hollow silica particles in the binder resin increases, and the refractive index of the low-refractive index layer decreases. Therefore, the content of the hollow silica particles is preferably 100 parts by mass or more, more preferably 125 parts by mass or more, with respect to 100 parts by mass of the binder resin.

Meanwhile, when the content of the hollow silica particles is excessively large with respect to the binder resin, the hollow silica particles exposed from the binder resin increases, and the binder resin binding the particles decreases. Therefore, the hollow silica particles tend to be easily damaged or drop out, so that the mechanical strength such as the scratch resistance of the low-refractive index layer tend to decrease. Therefore, the content of the hollow silica particles is preferably 400 parts by mass or less, more preferably 300 parts by mass or less, further preferably 200 parts by mass or less, with respect to 100 parts by mass of the binder resin.

When the content of the non-hollow silica particles is small, the presence of the non-hollow silica particles on the surface of the low-refractive index layer may not affect the increase in hardness. Further, when the non-hollow silica particles are contained in a large amount, the influence of shrinkage unevenness due to the polymerization of the binder resin can be reduced, and projections and recesses generated on the surface of the low-refractive index layer after the resin is cured can be smaller. Therefore, the content of the non-hollow silica particles is preferably 20 parts by mass or more, more preferably 40 parts by mass or more, further preferably 90 parts by mass or more, even more preferably 100 parts by mass or more, with respect to 100 parts by mass of the binder resin.

Meanwhile, when the content of the non-hollow silica particles is excessively large, the non-hollow silica tend to aggregate, shrinkage unevenness of the binder resin occurs, and projections and recesses on the surface become larger. Therefore, the content of the non-hollow silica particles is preferably 200 parts by mass or less, more preferably 150 parts by mass or less, further preferably 120 parts by mass or less, with respect to 100 parts by mass of the binder resin.

The hollow silica particles and the non-hollow silica particles contained in the binder resin at the aforementioned ratio can improve the barrier properties of the low-refractive index layer. It is inferred that this is because permeation of gas and the like is inhibited by the silica particles uniformly dispersed with high filling rate.

Further, various cosmetics such as sunscreens and hand creams may contain a polymer with low volatility and low molecular weight. The barrier properties of the low-refractive index layer is improved, thereby enabling penetration of the low-molecular weight polymer into the coating film of the low-refractive index layer to be suppressed and defects (for example, appearance abnormality) due to the low-molecular weight polymer remaining on the coating film for a long period of time to be suppressed.

The binder resin of the low-refractive index layer preferably contains a cured product of an ionizing radiation curable resin composition. Further, the ionizing radiation curable compound contained in the ionizing radiation curable resin composition is preferably a compound having an ethylenically unsaturated linking group. In particular, (meth)acrylate compounds having a (meth)acryloyl group are more preferable.

Hereinafter, (meth)acrylate compounds having four or more ethylenically unsaturated linking groups are referred to as "polyfunctional (meth)acrylate compounds". Further, (meth)acrylate compounds having two or more and three or less ethylenically unsaturated linking groups are referred to as "low-functionality (meth)acrylate compounds".

Both monomer and oligomer (meth)acrylate compounds can be used. In particular, the ionizing radiation curable compound preferably further contains a low-functionality (meth)acrylate compound, for easily suppressing shrinkage unevenness at the time of curing to facilitate smoothing the shape of projections and recesses on the surface of the low-refractive index layer.

The proportion of the low-functionality (meth)acrylate compound in the ionizing radiation curable compound is preferably 60 mass % or more, more preferably 80 mass % or more, further preferably 90 mass % or more, even more preferably 95 mass % or more, most preferably 100 mass %.

Further, the low-functionality (meth)acrylate compound is preferably a (meth)acrylate compound having two ethylenically unsaturated linking groups, for easily suppressing the shrinkage unevenness at the time of curing to facilitate smoothing the shape of projections and recesses on the surface of the low-refractive index layer.

Of (meth)acrylate compounds, examples of bifunctional (meth)acrylate compounds include polyalkylene glycol di(meth)acrylates such as di(meth)acrylate of isocyanuric acid, ethylene glycol di(meth)acrylate, polyethylene glycol diacrylate, and polybutylene glycol di(meth)acrylate, bisphenol A tetraethoxy diacrylate, bisphenol A tetrapropoxy diacrylate, and 1,6-hexanediol diacrylate.

Examples of trifunctional (meth)acrylate compounds include trimethylolpropane tri(meth)acrylate, pentaerythritol tri(meth)acrylate, and isocyanuric acid-modified tri(meth)acrylate.

Examples of polyfunctional (meth)acrylate compounds with four or more functionalities include pentaerythritol tetra(meth)acrylate, dipentaerythritol hexa(meth)acrylate, and dipentaerythritol tetra(meth)acrylate.

These (meth)acrylate compounds may be modified, as described later.

Further, examples of (meth)acrylate oligomers include acrylate polymers such as urethane(meth)acrylate, epoxy (meth)acrylate, polyester(meth)acrylate, and polyether (meth)acrylate.

The urethane(meth)acrylate can be obtained, for example, by reaction of a polyhydric alcohol, an organic diisocyanate, and hydroxy(meth)acrylate.

Further, a preferable epoxy(meth)acrylate is a (meth) acrylate obtained by reaction of (meth)acrylic acid with an aromatic epoxy resin, an alicyclic epoxy resin, an aliphatic epoxy resin or the like with three or more functionalities, a (meth)acrylate obtained by reaction of (meth)acrylic acid with an aromatic epoxy resin, an alicyclic epoxy resin, an aliphatic epoxy resin or the like with two or more functionalities and polybasic acid, and a (meth)acrylate obtained by reaction of (meth)acrylic acid with an aromatic epoxy resin, an alicyclic epoxy resin, an aliphatic epoxy resin or the like with two or more functionalities and a phenol.

Further, the (meth)acrylate compound may have a molecular skeleton partially modified, for suppressing shrinkage unevenness due to crosslinking to enhance the surface smoothness. For example, those modified with ethylene oxide, propylene oxide, caprolactone, isocyanuric acid, alkyl, cyclic alkyl, aromatic, bisphenol, or the like can be used as the (meth)acrylate compound. In particular, the (meth)acrylate compound is preferably modified with an alkylene oxide such as ethylene oxide and propylene oxide, in order to enhance the affinity with the low-refractive index particles (silica particles therein) to suppress the aggregation of the low-refractive index particles.

The proportion of the alkylene oxide-modified (meth) acrylate compound in the ionizing radiation curable compound is preferably 60 mass % or more, more preferably 80 mass % or more, further preferably 90 mass % or more, even more preferably 95 mass % or more, most preferably 100 mass %. Further, the alkylene oxide-modified (meth)acrylate compound is preferably a low-functionality (meth)acrylate compound, more preferably a (meth)acrylate compound having two ethylenically unsaturated linking groups.

Examples of the (meth)acrylate compound modified with alkylene oxide and having two ethylenically unsaturated linking groups include bisphenol F alkylene oxide-modified di(meth)acrylate, bisphenol A alkylene oxide-modified di(meth)acrylate, isocyanuric acid alkylene oxide-modified di(meth)acrylate and polyalkylene glycol di(meth)acrylate. Among them, polyalkylene glycol di(meth)acrylate is preferable. The average number of repeating units of alkylene glycol contained in the polyalkylene glycol di(meth)acrylate is preferably 3 or more and 5 or less. Further, the alkylene glycol contained in the polyalkylene glycol di(meth)acrylate is preferably ethylene glycol and/or polyethylene glycol.

Examples of a (meth)acrylate compound modified with alkylene oxide and having three ethylenically unsaturated linking groups include trimethylolpropane alkylene oxide-modified tri(meth)acrylate and isocyanuric acid alkylene oxide-modified tri(meth)acrylate.

The ionizing radiation curable resin may be used alone or in combination of two or more.

The low-refractive index layer preferably contains a leveling agent for antifouling properties and surface smoothness.

Examples of the leveling agent include fluorine and silicone leveling agents, and a silicone leveling agent is preferable. Containing a silicone leveling agent enable the low reflectance layer surface to be smoother. Further, the slipperiness and antifouling properties of the low reflectance layer surface (fingerprint wiping properties and a large contact angle with pure water and hexadecane) can be improved.

The content of the leveling agent is preferably 1 part by mass or more and 25 parts by mass or less, more preferably 2 parts by mass or more and 20 parts by mass or less, further preferably 5 parts by mass or more and 18 parts by mass or less, with respect to 100 parts by mass of the binder resin. Adjusting the content of the leveling agent to 1 part by mass or more enables various performances such as antifouling properties to be easily imparted. Further, adjusting the content of the leveling agent to 25 parts by mass or less can suppress the decrease of the scratch resistance.

The low-refractive index layer preferably has a maximum height roughness Rz of 110 nm or less, more preferably 90 nm or less, further preferably 70 nm or less, even more preferably 60 nm or less. Further, the Rz/Ra (Ra is an arithmetic average roughness) is preferably 12.0 or less, more preferably 10.0 or less. Adjusting the Rz/Ra to such a range is particularly effective in the case where the Rz is as large as about 90 nm or more and 110 nm or less.

In this description, the Ra and the Rz are three-dimensional expansions of the roughness of the two-dimensional roughness parameters described in the Upgrade Kit Operation Manual of a scanning probe microscope SPM-9600 (SPM-9600, February, 2016, P. 194-195) of SHIMADZU CORPORATION. The Ra and the Rz are defined, as follows.

(Arithmetic Average Roughness Ra)

When only the reference length (L) is extracted from the roughness curve in the direction of the average line, the X axis is taken in the direction of the average line of the extracted portion and the Y axis is taken in the direction of the vertical magnification, and the roughness curve is expressed by y=f(x), it can be determined by the following expression.

$$Ra = \frac{1}{L} \int_0^L |f(x)| dx \qquad \text{[Expression 1]}$$

(Maximum Height Roughness Rz)

It is a value obtained by extracting only the reference length from the roughness curve in the direction of the average line and measuring the interval between the ridge line and the valley line of the extracted portion in the interval of the vertical magnification of the roughness curve.

In the case of using the scanning probe microscope SPM-9600 of SHIMADZU CORPORATION, for example, the Ra and the Rz are preferably measured and analyzed under the following conditions.

<Measurement Conditions>
  Measurement mode: phase
  Scanning range: 5 μm×5 μm
  Scanning speed: 0.8 Hz or more and 1 Hz or less
  Number of pixels: 512×512
  Cantilever used: product number "NCHR" of NanoWorld Holding AG
  Resonance frequency: 320 kHz
  Spring constant: 42 N/m
<Analysis Condition>
  Tilt correction: line fit A small Rz means that the projections due to hollow silica particles in the microareas are small. Further, a small Rz/Ra means that the projections and recesses due to silica particles in the microareas are uniform, and there are no projections and recesses projecting from the average elevation difference of the projections and recesses. In the present disclosure, the numerical value of the Ra is not specifically limited, but the Ra is preferably 15 nm or less, more preferably 12 nm or less, further preferably 10 nm or less, even more preferably 6.5 nm or less.

Uniform dispersion of the low-refractive index particles in the low-refractive index layer and suppression of shrinkage unevenness in the low-refractive index layer enable the ranges of the Rz and the Rz/Ra to be easily satisfied.

Adjusting the Rz and the Rz/Ra on the surface of the low-refractive index layer to such ranges can reduce the resistance when the solid matter moves over the projections on the surface of the low-refractive index layer (due to the hollow silica particles present in the vicinity of the surface). Therefore, it is considered that the solid matter moves smoothly on the surface of the low refractive index layer even if it is rubbed with sand containing oil with a load applied. Further, it is also considered that the hardness of the recesses themselves has increased. As a result, it can be inferred that the hollow silica particles are prevented from being damaged or dropped out, and the binder resin itself is also prevented from being damaged.

The surface roughnesses such as Rz and Ra mean the average of the measured values at fourteen points excluding the minimum value and the maximum value of the measured values at sixteen points unless otherwise particularly noted.

In this description, the sixteen measurement points are preferably set by setting the area 0.5 cm from the outer edge of the measurement sample as the margin and taking sixteen points at intersections as the measurement center when lines dividing the area inside the margin into five in the vertical and horizontal directions are drawn. The measurement sample preferably has a size of 5 cm×5 cm.

The low-refractive index layer can be formed by applying and drying a coating solution for forming low-refractive index layers that is obtained by dissolving or dispersing components constituting the low-refractive index layer. In general, solvents for adjusting the viscosity or enabling the components to be dissolved or dispersed are used in the coating solution for forming the low-refractive index layer.

Examples of the solvents include ketones (such as acetone, methyl ethyl ketone, methyl isobutyl ketone, and cyclohexanone), ethers (such as dioxane and tetrahydrofuran), aliphatic hydrocarbons (such as hexane), alicyclic hydrocarbons (such as cyclohexane), aromatic hydrocarbons (such as toluene and xylene), halogenated carbons (such as dichloromethane and dichloroethane), esters (such as methyl acetate, ethyl acetate, and butyl acetate), alcohols (such as butanol and cyclohexanol), cellosolves (such as methyl cellosolve and ethyl cellosolve), cellosolve acetates, sulfoxides (such as dimethylsulfoxide), glycol ethers (such as 1-methoxy-2-propyl acetate), and amides (such as dimethylformamide and dimethylacetamide), and the mixtures of these may be used.

In the case where the solvents evaporate excessively rapidly, the solvents vigorously convect when drying the coating solution for forming low-refractive index layers. Therefore, even if the silica particles in the coating solution have been uniformly dispersed, the state of uniform dispersion easily collapses due to the vigorous convection of the solvents during drying. Therefore, the solvents preferably contain a component with slow evaporation rate. Specifically, it is preferable to contain a solvent having a relative evaporation rate (relative evaporation rate when the evaporation rate of n-butyl acetate is taken as 100) of 70 or less, more preferably 30 or more and 60 or less. Further, the proportion of the solvent having a relative evaporation rate of 70 or less is preferably 10 mass % or more and 50 mass % or less, preferably 20 mass % or more and 40 mass % or less of all solvents.

Examples of the relative evaporation rate of the solvent with slow evaporation rate include 64 of isobutyl alcohol, 47 of 1-butanol, 44 of 1-methoxy-2-propyl acetate, 38 of ethyl cellosolve, and 32 of cyclohexanone.

The residue of solvents (solvents other than solvent with slow evaporation rate) preferably have excellent ability to dissolve resins. Further, the residue of solvents preferably has a relative evaporation rate of 100 or more.

Further, the drying temperature when forming the low-refractive index layer is preferably as low as possible, in order to suppress the convection of the solvents during drying and improve the dispersibility of the silica particles. The drying temperature can be appropriately set in consideration of the types of the solvents, the dispersibility of the silica particles, the production speed, and the like.

<Reflectance>

The optical film of the present disclosure preferably has a reflectance, as measured from the low-refractive index layer side, of 2.00% or less, more preferably 1.70% or less, more preferably 1.20% or less, further preferably 1.00% or less.

In this description, the reflectance refers to the visual reflectance Y value in the CIE1931 standard color system. The reflectance preferably calculated by averaging the values at any ten points.

In this description, the reflectance of the optical film is measured by producing a sample bonded with a black plate via a transparent pressure-sensitive adhesive layer on the side opposite to the surface on which the reflectance of the optical film is measured and allowing light to be incident from the low-refractive index layer side of the sample at an incident angle of 5°. The light source for measuring the reflectance is preferably a C light source.

The difference in refractive index between member in contact with the transparent pressure-sensitive adhesive layer of the sample (for example, the biaxially stretched plastic film) and the transparent pressure-sensitive adhesive layer is preferably 0.15 or less, more preferably 0.10 or less, more preferably 0.05 or less, more preferably 0.01 or less. Further, the black plate preferably has a total light transmittance according to JIS K7361-1:1997 of 1% or less, more preferably 0%. Further, the difference between the refractive index of the resin constituting the black plate and the refractive index of the transparent pressure-sensitive adhesive layer is preferably 0.15 or less, more preferably 0.10 or less, more preferably 0.05 or less, more preferably 0.01 or less.

<Haze and Total Light Transmittance>

The optical film preferably has a haze according to JIS K7136:2000 of 5% or less, more preferably 4% or less, further preferably 3% or less. Further, the optical film preferably has a haze according to JIS K7136:2000 of 0.5% or more, more preferably 1.0% or more, further preferably 1.5% or more.

Further, the optical film preferably has a total light transmittance according to JIS K7361-1:1997 of 90% or more, more preferably 91% or more, further preferably 92% or more.

<Other Layers>

The optical film of the present disclosure may have layers other than the biaxially stretched plastic film and the low-refractive index layer. The low-refractive index layer and layers other than the low-refractive index layer are preferably optically isotropic. The optically isotropic layers mean layers having an in-plane phase difference of less than 20 nm, preferably 10 nm or less, more preferably 5 nm or less.

For example, the optical film of the present disclosure preferably has one or more layers selected from a hard coating layer, an anti-glare layer, and a high-refractive index layer between the biaxially stretched plastic film and the low-refractive index layer.

<<High-Refractive Index Layer>>

The high-refractive index layer is formed on the biaxially stretched plastic film side to the low-refractive index layer, as required. In the case where the later-described hard coating layer is provided, the high-refractive index layer is preferably formed between the hard coating layer and the low-refractive index layer.

The high-refractive index layer preferably has a refractive index of 1.53 or more and 1.85 or less, more preferably 1.54 or more and 1.80 or less, more preferably 1.55 or more and 1.75 or less, more preferably 1.56 or more and 1.70 or less.

Further, the thickness of the high-refractive index layer is preferably 200 nm or less, more preferably 50 nm or more and 180 nm or less, further preferably 70 nm or more and 150 nm or less. In the case where a high-refractive index hard coating layer is provided, it preferably has a thickness equivalent to the thickness of the hard coating layer.

The high-refractive index layer can be formed, for example, from a coating solution for forming high-refractive index layers, containing a binder resin composition and high-refractive index particles. Examples of the binder resin composition include curable resin compositions described below as examples for the hard coating layer.

Examples of the high-refractive index particles include antimony pentoxide, zinc oxide, titanium oxide, cerium oxide, tin-doped indium oxide, antimony-doped tin oxide, yttrium oxide, and zirconium oxide. The refractive index of antimony pentoxide is about 1.79, the refractive index of zinc oxide is about 1.90, the refractive index of titanium oxide is about 2.3 or more and 2.7 or less, the refractive index of cerium oxide is about 1.95, the refractive index of tin-doped indium oxide is about 1.95 or more and 2.00 or less, the refractive index of antimony-doped tin oxide is about 1.75 or more and 1.85 or less, the refractive index of yttrium oxide is about 1.87, and the refractive index of zirconium oxide is 2.10.

The average particle size of the high-refractive index particles is preferably 2 nm or more, more preferably 5 nm or more, further preferably 10 nm or more. Further, the average particle size of the high-refractive index particles is preferably 200 nm or less, more preferably 100 nm or less, more preferably 80 nm or less, more preferably 60 nm or less, more preferably 30 nm or less, for suppressing whitening and ensuring transparency. The smaller the average particle size of the high-refractive index particles, the better the transparency. In particular, the average particle size of 60 nm or less can extremely improve the transparency.

The average particle size of the high-refractive index particles or the low-refractive index particles can be calculated by the following operations (y1) to (y3).

(y1) Capture an image of the cross section of the high-refractive index layer or the low-refractive index layer by TEM or STEM. The acceleration voltage of TEM or STEM is preferably set to 10 kv or more and 30 kV or less, the magnification is preferably set to 50,000 times or more and 300,000 times or less.

(y2) Extract any ten particles from the observation image to calculate the particle size of individual particles. The particle size is measured as a linear distance in a combination of any two parallel straight lines sandwiching each particle in cross section in which the distance between the two straight lines is maximum. In the case where the particles are aggregated, the aggregated particles are regarded as one particle and measured.

(y3) Repeat the same operation five times in an observation image on another screen of the same sample and use the value obtained from the number average of the particle sizes of fifty particles in total as the average particle size of the high-refractive index particles or the low-refractive index particles.

<<Hard Coating Layer>>

The hard coating layer is formed for improving the scratch resistance of the optical film, as required. The hard coating layer is preferably formed between the biaxially stretched plastic film and the low-refractive index layer. In the case where the optical film further has a high-refractive index layer, the hard coating layer, the high-refractive index layer, and the low-refractive index layer are preferably disposed on the biaxially stretched plastic film in this order.

The hard coating layer preferably contains a cured product of a curable resin composition such as a thermosetting resin composition or an ionizing radiation curable resin composition, more preferably a cured product of an ionizing radiation curable resin composition, for improve the scratch resistance.

The thermosetting resin composition is a composition containing at least a thermosetting resin and is a resin composition cured by heating. Examples of the thermosetting resin include acrylic resins, urethane resins, phenolic resins, urea melamine resins, epoxy resins, unsaturated polyester resins, and silicone resins. In the thermosetting resin composition, a curing agent is added to such a curable resin, as required.

The ionizing radiation curable resin composition is a composition containing a compound having an ionizing radiation curable functional group (which will be hereinafter referred to as "ionizing radiation curable compound"). Examples of the ionizing radiation curable functional group include ethylenically unsaturated linking groups such as a (meth)acryloyl group, a vinyl group, and a allyl group, as well as an epoxy group and an oxetanyl group. The ionizing radiation curable compound is preferably a compound having an ethylenically unsaturated linking group, more preferably a compound having two or more ethylenically unsaturated linking groups, further preferably a (meth)acrylate compound having two or more ethylenically unsaturated linking groups. Both monomer and oligomer (meth)acrylate compounds having two or more ethylenically unsaturated linking groups can be used.

The ionizing radiation means electromagnetic waves or charged particle beams having energy quanta that can polymerize or crosslink molecules. Ultraviolet rays (UV) or electron beams (EB) are generally used, but electromagnetic waves such as X-rays and y-rays and charged particle beams such as α-rays and ion rays can be used, in addition.

In this description, a (meth)acrylate means an acrylate or a methacrylate, a (meth)acrylic acid means an acrylic acid or a methacrylic acid, and a (meth)acryloyl group means an acryloyl group or a methacryloyl group.

The thickness of the hard coating layer is preferably 0.1 μm or more, more preferably 0.5 μm or more, further preferably 1.0 μm or more, even more preferably 2.0 μm or more, for improve the scratch resistance. Further, the thickness of the hard coating layer is preferably 100 μm or less, more preferably 50 μm or less, more preferably 30 μm or less, more preferably 20 μm or less, more preferably 15 μm or less, more preferably 10 μm or less, for suppressing curling. The thickness of the hard coating layer is preferably 10 μm or less, more preferably 8 μm or less, in order to improve the foldability.

<<Anti-Glare Layer>>

The anti-glare layer can be formed, for example, from a coating solution for forming anti-glare layers, containing a binder resin composition and particles. As the binder resin composition, curable resin compositions described as examples for the hard coating layer can be used, for example.

As the particles, both organic particles and inorganic particles can be used. Examples of the organic particles include particles made of polymethylmethacrylate, polyacrylic-styrene copolymer, melamine resin, polycarbonate, polystyrene, polyvinyl chloride, benzoguanamine-melamine-formaldehyde condensate, silicone, fluororesin, and polyester resin. Examples of the inorganic particles include particles made of silica, alumina, antimony, zirconia, and titania.

The average particle size of the particles in the anti-glare layer cannot be said unconditionally since it varies depending on the thickness of the anti-glare layer but is preferably 1.0 μm or more and 10.0 μm or less, more preferably 2.0 μm or more and 8.0 μm or less, further preferably 3.0 μm or more and 6.0 μm or less.

The average particle size of the particles in the anti-glare layer can be calculated by the following operations (z1) to (z3).

(z1) Capture a transmission observation image of the cross section of the anti-glare layer with an optical microscope. The magnification is preferably set to 500 times or more and 2,000 times or less.
(z2) Extract any ten particles from the observation image to calculate the particle size of individual particles. The particle size is measured as a linear distance in a combination of any two parallel straight lines sandwiching each particle in cross section in which the distance between the two straight lines is maximum.
(z3) Repeat the same operation five times in an observation image on another screen of the same sample and use the value obtained from the number average of the particle sizes of fifty particles in total as the average particle size of the particles in the anti-glare layer.

The content of the particles in the anti-glare layer cannot be said unconditionally since it varies depending on the degree of target anti-glare properties, but is preferably 1 part by mass or more and 100 parts by mass or less, more preferably 5 parts by mass or more and 50 parts by mass or less, further preferably 10 parts by mass or more and 30 parts by mass or less, with respect to 100 parts by mass of the resin component.

The anti-glare layer may contain fine particles with an average particle size of less than 500 nm, for imparting antistatic properties, controlling the refractive index, or adjusting the shrinkage of the anti-glare layer due to curing of the curable resin composition.

The thickness of the anti-glare layer is preferably 0.5 μm or more, more preferably 1.0 μm or more, further preferably 2.0 μm or more. Further, the thickness of the anti-glare layer is preferably 50 μm or less, more preferably 30 μm or more, more preferably 20 μm or less, more preferably 15 μm or less, more preferably 10 μm or less. The thickness of the anti-glare layer is preferably 10 μm or less, more preferably 8 μm or less, in order to improve the foldability.

<Examples of Layer Structure>

The following examples (1) to (5) exemplify the layer structure of the optical film of the present disclosure.
(1) A configuration of having the low-refractive index layer on the biaxially stretched plastic film.
(2) A configuration of having the hard coating layer and the low-refractive index layer on the biaxially stretched plastic film in this order.
(3) A configuration of having the high-refractive index layer and the low-refractive index layer on the biaxially stretched plastic film in this order.
(4) A configuration of having the anti-glare layer and the low-refractive index layer on the biaxially stretched plastic film in this order.
(5) A configuration of having the hard coating layer, the high-refractive index layer, and the low-refractive index layer on the biaxially stretched plastic film in this order.

The overall thickness of the optical film is preferably 100 μm or less, more preferably 60 μm or less, in order to maintain the mechanical properties, suppress excessive variations in optical properties such as in-plane phase difference, and suppress blackout well. Further, the balance between the thickness of the biaxially stretched plastic film and the thickness of layers other than the biaxially stretched plastic film in the optical film is preferably 10:4 to 10:0.5.

<Form and Size>

The optical film may be in the form of a sheet cut into a predetermined size or may be in the form of a roll obtained by winding a long sheet into a roll. Further, the size of the sheet is not specifically limited, but the maximum diameter is about 2 inch or more and 500 inch or less, suitably 30 inch or more and 80 inch or less in the present disclosure. The "maximum diameter" refers to the maximum length when any two points in the optical film are connected. For example, in the case where the optical film is rectangular, the diagonal line of the rectangular area is the maximum diameter. Further, in the case where the optical film is circular, the diameter is the maximum diameter.

The width and the length of the roll is not specifically limited, but in general, the width is 500 mm or more and 3,000 mm or less, and the length is about 100m or more and 5,000m or less. The optical film in the form of a roll form can be cut into a sheet according to the size of an image display device or the like for use. When cutting, it is preferable to exclude the edge of the roll where the physical properties are not stable.

Further, the shape of the sheet is not specifically limited and may be, for example, a polygon (such as a triangle, a quadrangle, and a pentagon), a circle, or a random amorphous shape. More specifically, in the case where the optical film is quadrangular, the aspect ratio is not specifically limited, as long as there is no problem as a display screen. Examples of the ratio include horizonal:vertical=1:1, 4:3, 16:10, 16:9, and 2:1.

<Applications>

The optical film of the present disclosure can be suitably used as an optical film for image display devices.

Further, the optical film of the present disclosure can be suitably used as an optical film to be disposed on the light emitting surface side of a display element of an image display device. At this time, a polarizer is preferably provided between the display element and the optical film of the present disclosure.

In the case where the biaxially stretched plastic film satisfies the condition 2, it is possible to suppress folding habits remaining after the folding test or breakage, regardless of the folding direction. Therefore, in the case where the biaxially stretched plastic film satisfies the condition 2, it can be more preferably used as a plastic film for curved image display devices and foldable image display devices.

[Polarizing Plate]

The polarizing plate of the present disclosure is a polarizing plate having a polarizer, a first transparent protective plate disposed on one side of the polarizer, and a second transparent protective plate disposed on the other side of the polarizer, wherein at least one selecting from the group consisting of the first transparent protective plate and the second transparent protective plate is the optical film of the present disclosure.

In the polarizing plate, the optical film is preferably disposed so that the surface on the biaxially stretched plastic film side faces the polarizer side.

Figure 5:
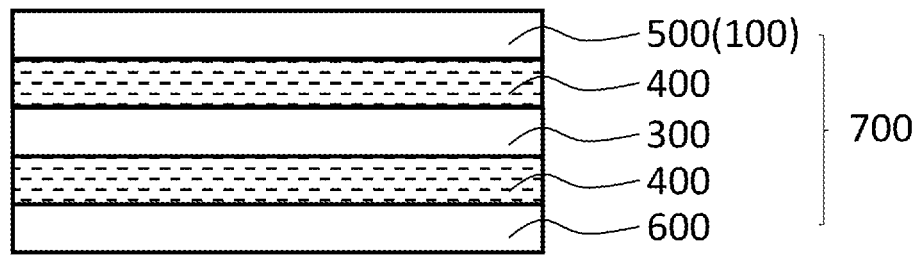
FIG. 5 is a sectional view showing one embodiment of the polarizing plate of the present disclosure.

FIG. 5 is a sectional view showing an embodiment of the polarizing plate 700 of the present disclosure. The polarizing plate 700 in FIG. 5 has the polarizer 300, a first transparent protective plate (500) disposed on one side of the polarizer, and a second transparent protective plate (600) disposed on the other side of the polarizer. Further, the polarizing plate 700 in FIG. 5 uses the optical film 100 as the first transparent protective plate (500). In the polarizing plate 700 in FIG. 5, the polarizer 300, the first transparent protective plate (500) and the second transparent protective plate (600) are laminated via the adhesive layer 400.

The polarizing plate is used, for example, for imparting anti-reflection properties in combination with a λ/4 phase difference plate. In this case, the λ/4 phase difference plate is disposed on the display element of an image display device, and the polarizing plate is disposed on the viewer side to the λ/4 phase difference plate.

Further, in the case where the polarizing plate is for liquid crystal display devices, it is used for imparting functions of the liquid crystal shutter. In this case, a lower polarizing plate, a liquid crystal display element, and an upper polarizing plate are disposed in this order in the liquid crystal display device, so that the absorption axis of the polarizer of the lower polarizing plate and the absorption axis of the polarizer of the upper polarizing plate are orthogonal to each other. In the configuration of the liquid crystal display device, it is preferable to use the polarizing plate of the present disclosure as the upper polarizing plate.

<Transparent Protective Plate>

The polarizing plate of the present disclosure uses the optical film of the present disclosure as at least one selecting from the group consisting of the first transparent protective plate and the second transparent protective plate. It is preferable that both the first transparent protective plate and the second transparent protective plate are the optical films of the present disclosure.

In the case where one of the first transparent protective plate and the second transparent protective plate is the optical film of the present disclosure, the other transparent protective plate is not specifically limited but is preferably an optically isotropic transparent protective plate. In this description, the optically isotropic transparent protective plate refers to those having an in-plane phase difference of less than 20 nm, preferably 10 nm or less, more preferably 5 nm or less. Examples of the optically isotropic transparent protective plate include acrylic films, cyclic polyolefin films, and triacetyl cellulose (TAC) films. Acrylic films and cyclic polyolefin films are preferable since they are less likely to be distorted when the polarizing plate absorbs water and thus can protect the polarizer well, because they have a moisture permeability similar to that of the biaxially stretched plastic film.

Further, in the case where only one of the first transparent protective plate and the second transparent protective plate is the optical film of the present disclosure, it is preferable to use the optical film of the present disclosure as the transparent protective plate on the light emitting side.

<Polarizer>

Examples of the polarizer include a sheet-type polarizer formed by stretching a film stained with iodine or the like (such as polyvinyl alcohol films, polyvinyl formal films, polyvinyl acetal films, and ethylene-vinyl acetate copolymer saponification films), a wire grid polarizer consisting of many metal wires aligned in parallel, a coated polarizer coated with lyotropic liquid crystal and dichroic guest-host material, and a multilayer thin film-type polarizer. Such a polarizer may be a reflective polarizer having a function of reflecting polarization components that do not transmit.

The polarizer is preferably disposed so that the angle formed by the absorption axis and the slow axis of the biaxially stretched plastic film falls within 90 degrees±5 degrees. The angle is more preferably within 90 degrees±3 degrees, further preferably within 90 degrees±1 degree.

[Image Display Device (1)]

The image display device (1) of the present disclosure is an image display device having a display element, and a polarizer and an optical film disposed on the light emitting surface side of the display element, wherein the optical film is the optical film of the present disclosure, and disposition is such that the angle formed by the absorption axis of the polarizer and the slow axis of the biaxially stretched plastic film of the optical film falls within 90 degrees±5 degrees, and that the surface on the low-refractive index layer side of the optical film faces the side opposite to the display element. The angle is preferably within 90 degrees±3 degrees, more preferably within 90 degrees±1 degree.

Figure 6:
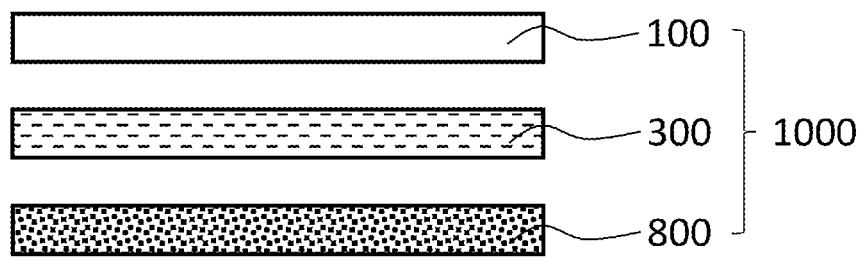
FIG. 6 is a sectional view showing one embodiment of the image display device of the present disclosure.

FIG. 6 is a sectional view showing an embodiment of the image display device (1) and the later-described image display device (2) of the present disclosure.

The image display device 1000 in FIG. 6 has the optical film 100 on the light emitting surface side of a display element 800 (upper side in FIG. 6).

Further, the image display device 100 in FIG. 6 has the polarizer 300 between the display element 800 and the optical film 100.

The image display device 1000 is not limited to the form shown in FIG. 6. For example, the members constituting the image display device 1000 are disposed at predetermined intervals in FIG. 6, but the members are preferably integrally laminated via adhesive layers or the like. Further, the image display device may have members not shown (other optical films or the like).

<Display Element>

Examples of the display element include liquid crystal display elements, EL display elements (including organic EL display elements and inorganic EL display elements), and plasma display elements, and further include LED display elements such as Mini LEDs and micro LED display elements, liquid crystal display elements using QDs, and LED display elements.

In the case where the display element of the display device is a liquid crystal display element, a backlight is required on the surface of the liquid crystal display element opposite to the resin sheet.

Further, the image display device may be an image display device having a touch panel function.

Examples of the touch panel include a resistance film type, a capacitance type, an electromagnetic induction type, an infrared type, and an ultrasonic type.

The touch panel function may be one in which a function is added in the display element such as an in-cell touch panel liquid crystal display element or may be one in which a touch panel is placed on the display element.

Further, the optical film can suppress folding habits remaining after the folding test or breakage, as long as the biaxially stretched plastic film satisfies the condition 2. Therefore, the image display device is preferably a curved image display device or a foldable image display device, as long as the biaxially stretched plastic film satisfies the condition 2.

In the case where the image display device is a curved image display device or a foldable image display device, the display element is preferably an organic EL display element.

<Other Plastic Films>

The image display device of the present disclosure may have other plastic films, as long as the effects of the present disclosure are not inhibited.

The other plastic films are preferably optically isotropic.

[Image Display Device (2)]

The image display device of the present disclosure is an image display device comprising a display element, and a polarizer and an optical film on the light emitting surface of a display element, wherein disposition such that the angle formed by the direction of the absorption axis of the polarizer and the horizontal or vertical direction of the display element falls within ±5 degrees, and the angle formed by the absorption axis of the polarizer and the slow axis of the biaxially stretched plastic film of the optical film falls within 90 degrees±5 degrees, the optical film has a low-refractive index layer on a biaxially stretched plastic film with an in-plane phase difference of less than 2500 nm, the low-refractive index layer is located on the outermost surface of the optical film, and the optical film has a region in which the difference between the maximum value and the minimum value of $\Delta Eab$ is less than 17.0.

Here, the $\Delta Eab$ is calculated as follows: a laminate 1A is subjected to the measurement 1A to calculate $L^*$ value, $a^*$ value, and $b^*$ value in the $L^*a^*b^*$ color system. A laminate 2A is subjected to the measurement 2A to calculate $L^*$ value, $a^*$ value, and $b^*$ value in the $L^*a^*b^*$ color system. Based on the results of the measurement 1A and the measurement 2A, the $\Delta Eab$ is calculated under the condition 1A.

<Measurement 1A>

The laminate 1A is produced by laminating the polarizer and the optical film on the display element in this order. In the laminate 1A, the optical film is disposed so that the surface on the low-refractive index layer side faces the side opposite to the polarizer. Further, the polarizer is disposed so that the angle formed by the absorption axis of the polarizer and the horizontal or vertical direction of the display element falls within ±5 degrees. Further, the polarizer is disposed so that the angle formed by the absorption axis of the polarizer and the slow axis of the biaxially stretched plastic film of the optical film falls within 90 degrees±5 degrees.

The display element of the laminate 1A is displayed in white, and the transmitted light emitted from the low-refractive index layer side of the laminate 1A is measured at 1 degree intervals in ranges of an elevation angle of 0 degrees or more and 80 degrees or less and an azimuth angle of 0 degrees or more and 359 degrees or less, to calculate $L^*$ value, $a^*$ value, and $b^*$ value in the $L^*a^*b^*$ color system based on the transmitted light at each angle. The transmitted light measurement area is set to any in-plane area of 1 $mm^2$ or more and 10 $mm^2$ or less.

<Measurement 2A>

The laminate 2A is produced by laminating the polarizer on the display element that is the same as the display element in the measurement 1A.

The display element of the laminate 2A is displayed in white, and the transmitted light emitted from the polarizer side of the laminate 2A is measured at 1 degree intervals in ranges of an elevation angle of 0 degrees or more and 80 degrees or less and an azimuth angle of 0 degrees or more and 359 degrees or less, to calculate $L^*$ value, $a^*$ value, and $b^*$ value in the $L^*a^*b^*$ color system based on the transmitted light at each angle. The transmitted light measurement area substantially coincides with that in the measurement 1A in the plane.

<Condition 1A>

At each elevation angle and each azimuth angle, $\Delta L^*$ is calculated by subtracting the $L^*$ value in the measurement 2A from the $L^*$ value in the measurement 1A. Values from the maximum value to the minimum value of the $\Delta L^*$ are converted to grayscale to a predetermined gradation and displayed in grayscale in two-dimensional coordinates with the elevation angle as concentric circles and the azimuth angle in the vertical and horizontal directions.

It is confirmed that there are two regions in which the $\Delta L^*$ is concentrically distributed in the two-dimensional coordinates, and that the two regions are in substantially symmetric positions in the two-dimensional coordinates.

With respect to the elevation angle located at the center of the region where the $\Delta L^*$ is concentrically distributed, one elevation angle is referred to as $\alpha$ degree(s) and the other elevation angle is referred to as $\beta$ degree(s).

The ΔEab at each azimuth angle is calculated from the differences between the L* value, the a* value, and the b* value in the measurement 1A with an azimuth angle of 0 degrees or more and 359 degrees or less at an elevation angle of $(\alpha+\beta)/2$ and the L* value, the a* value, and the b* value in the measurement 2A with an azimuth angle of 0 degrees or more and 359 degrees or less at an elevation angle of $(\alpha+\beta)/2$, respectively.

The "laminate 1A" in the measurement 1A of the image display device (2) means the image display device (2). Further, the "laminate 2A" in the measurement 2A of the image display device (2) means the image display device (2) excluding the optical film of the present disclosure.

The measurement 1A and the measurement 2A in the image display device (2) of the present disclosure are the same as the measurement 1 and the measurement 2 of the optical film of the present disclosure except that the surface light source and the display element are different.

Further, the preferable embodiments of the measurement 1A and the measurement 2A are the same as the preferable embodiments of the measurement 1 and the measurement 2 (for example, the preferable ranges of the L* value, the a* value, and the b* value in the state of the laminate 2A are the same as the preferable ranges of the L* value, the a* value, and the b* value in the state of the laminate 2). Further, the preferable embodiments of the condition 1A are the same as the preferable embodiments of the condition 1.

[Method for Selecting Optical Film of Image Display Device]

The method for selecting an optical film of an image display device of the present disclosure is a method for selecting an optical film of an image display device comprising a display element, and a polarizer and an optical film on the light emitting surface of the display element, wherein disposition is such that the direction of the absorption axis of the polarizer is parallel to the horizontal or vertical direction of the display element, the method comprising selecting, as the optical film, an optical film X satisfying determination conditions that the optical film X has a low-refractive index layer on a biaxially stretched plastic film with an in-plane phase difference of less than 2500 nm, the low-refractive index layer is located on the outermost surface of the optical film X, and the optical film has a region in which the difference between the maximum value and the minimum value of ΔEab is less than 17.0.

Here, the ΔEab is calculated as follows: a laminate 1B is subjected to the measurement 1B to calculate L* value, a* value, and b* value in the L*a*b* color system. A laminate 2B is subjected to the measurement 2B to calculate L* value, a* value, and b* value in the L*a*b* color system. Based on the results of the measurement 1B and the measurement 2B, the ΔEab is calculated under the condition 1B.

<Measurement 1B>

A laminate 1B is produced by laminating the polarizer and the optical film X on the display element in this order. In the laminate 1B, the optical film is disposed so that the surface on the low-refractive index layer side faces the side opposite to the polarizer. Further, the polarizer is disposed so that the angle formed by the absorption axis of the polarizer and the horizontal or vertical direction of the display element falls within ±5 degrees. Further, the polarizer is disposed so that the angle formed by the absorption axis of the polarizer and the slow axis of the biaxially stretched plastic film of the optical film X falls within 90 degrees±5 degrees.

The display element of the laminate 1B is displayed in white, and the transmitted light emitted from the low-refractive index layer side of the laminate 1B is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle. The transmitted light measurement area is set to any in-plane area of 1 $mm^2$ or more and 10 $mm^2$ or less.

<Measurement 2B>

A laminate 2B is produced by laminating the polarizer on the display element that is the same as the display element in the measurement 1B.

The display element of the laminate 2B is displayed in white, and the transmitted light emitted from the polarizer side of the laminate 2B is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle. The transmitted light measurement area substantially coincides with that in the measurement 1B in the plane.

<Condition 1B>

At each elevation angle and each azimuth angle, ΔL* is calculated by subtracting the L* value in the measurement 2B from the L* value in the measurement 1B. Values from the maximum value to the minimum value of the ΔL* are converted to grayscale to a predetermined gradation and displayed in grayscale in two-dimensional coordinates with the elevation angle as concentric circles and the azimuth angle in the vertical and horizontal directions.

It is confirmed that there are two regions in which the ΔL* is concentrically distributed in the two-dimensional coordinates, and that the two regions are in substantially symmetric positions in the two-dimensional coordinates.

With respect to the elevation angle located at the center of the region where the ΔL* is concentrically distributed, one elevation angle is referred to as α degree(s) and the other elevation angle is referred to as β degree(s).

The ΔEab at each azimuth angle is calculated from the differences between the L* value, the a* value, and the b* value in the measurement 1B with an azimuth angle of 0 degrees or more and 359 degrees or less at an elevation angle of $(\alpha+\beta)/2$ and the L* value, the a* value, and the b* value in the measurement 2B with an azimuth angle of 0 degrees or more and 359 degrees or less at an elevation angle of $(\alpha+\beta)/2$, respectively.

In the method for selecting an optical film of an image display device of the present disclosure, the "image display device disposed so that the direction of the absorption axis of the polarizer is parallel to the horizontal or vertical direction of the display element" means an image display device in which the angle formed by the direction of the absorption axis of the polarizer and the horizontal or vertical direction of the display element falls within ±5 degrees. Further, the angle is preferably within ±3 degrees, more preferably within ±5 degrees.

The measurement 1B and the measurement 2B in the method for selecting an optical film of an image display device of the present disclosure are the same as the measurement 1 and the measurement 2 for the optical film of the present disclosure except that the surface light source and the display element are different.

Further, the preferable embodiments of the measurement 1B and the measurement 2B are the same as the preferable embodiments of the measurement 1 and the measurement 2 (for example, the preferable ranges of the L* value, the a* value, and the b* value in the state of the laminate 2B are the same as the preferable ranges of the L* value, the a* value, and the b* value in the state of the laminate 2). Further, the preferable embodiments of the condition 1B are the same as the preferable embodiments of the condition 1.

The method for selecting an optical film of an image display device of the present disclosure preferably further has additional determination conditions as the determination conditions. Examples of the additional determination conditions include preferable embodiments of the optical film of the present disclosure (such as phase difference in the thickness direction and surface roughness).

The method for selecting an optical film of an image display device of the present disclosure is useful as a method for selecting an optical film of an image display device having a polarizer on a surface on the light emitting surface side of a display element. Especially, it is useful as a method for selecting an optical film of an image display device disposed so that the direction of the absorption axis of the polarizer is parallel to the horizontal or vertical direction of the display element.

EXAMPLES

Next, the present disclosure will be described further in detail by way of Examples, but the present disclosure is not limited by these examples at all.
1. Measurement and Evaluation The following measurement and evaluation were performed in an atmosphere at a temperature of 23° C.±5° C. and a relative humidity of 40% RH or more and 65% RH or less. Further, each sample was exposed to the atmosphere for 30 minutes or more before the measurement and evaluation.
1-1. In-Plane Phase Difference (Re), Phase Difference in Thickness Direction (Rth), and Slow Axis Direction From the plastic films produced or prepared in section "2" below to be used in Examples, Comparative Examples, and Reference Examples, a sample of 50 mm in vertical×50 mm in horizonal was cut out. At that time, the flow direction (MD direction) of the plastic film was regarded as the vertical direction, and the width direction (TD direction) of the plastic film was regarded as the horizontal direction. The in-plane phase difference, the phase difference in the thickness direction, and the slow axis direction were measured at a total of five points including four points 10 mm advanced from the four corners of each the sample toward the center and the center of the sample. Table 1 shows the average of Re1 to Re5 or the like calculated from the measurement results. The measuring device used was product name "RETS-100 (measurement spot: diameter 5 mm)", available from Otsuka Electronics Co., Ltd. The slow axis direction was measured in the range of 0 degrees or more and 90 degrees or less with the flow direction (MD direction) of the plastic film taken as 0 degrees as a reference.
1-2. Foldability
<TD Direction>

From the plastic films produced or prepared in section "2" below to be used in Examples, Comparative Examples, and Reference Examples, a strip-shaped sample with a short side (TD direction) of 30 mm×a long side (MD direction) of 100 mm was cut out. Both ends on the short side (30 mm) of the sample were fixed to a durability tester (product name: "DLDMLH-FS", available from YUASA SYSTEM CO., LTD.) (the areas 10 mm from the tips were fixed), and a repeated folding test of 180 degree folding was performed 100,000 times. The folding speed was 120 times per minute. A more detailed technique of the folding test was as follow.

After the folding test, the strip-shaped sample was placed on a horizontal table, and the angle at which the edge of the sample rise from the table was measured. If the angle was 15 degrees or less, it is acceptable. Table 1 shows the results. If the sample broke in the middle of the test, it was shown as "broken".
<MD Direction>

From the plastic films produced or prepared in section "2" below to be used in Examples, Comparative Examples, and Reference Examples, a strip-shaped sample with a short side (MD direction) of 30 mm×a long side (TD direction) of 100 mm was cut from and was subjected to the same evaluation as above.
<Details of Folding Test>

Figure 10:
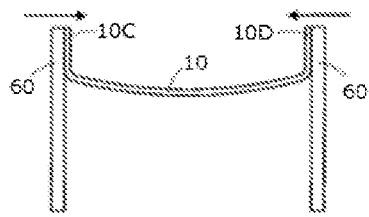
FIG. 10 (A)-(C) include diagrams schematically showing the state of the repeated folding test.
Figure 10:
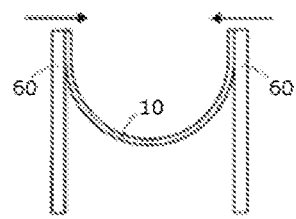
Figure 10:
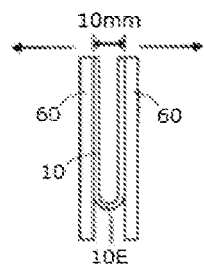

First, a side portion 10C of the plastic film 10 and a side portion 10D facing the side portion 10C were respectively fixed by fixing portions 60 disposed in parallel in the repeated folding test, as shown in FIG. 10(A). Each fixing portion 60 was slidable in the horizontal direction.

Then, the fixing portions 60 were moved so as to come close to each other, so that the plastic film 10 was deformed to be folded, as shown in FIG. 10(B). Further, as shown in FIG. 10(C), the fixing portions 60 were moved to the positions where the interval between the two side portions facing each other fixed by the fixing portions 60 of the plastic film 10 was 10 mm, and then the fixing portions 60 were moved in the reverse direction to eliminate the deformation of the plastic film 10.

As shown in FIG. 10(A) to FIG. 10(C), the plastic film 10 can be folded 180 degrees by moving the fixing portions 60. Further, the interval between the two side portions facing each other of the optical film 10 can be adjusted to 10 mm by performing the repeated folding test so that a bent portion 10E of the plastic film 10 does not protrude from the lower ends of the fixing portions 60 and controlling the interval when the fixing portions 60 are closest to each other to 10 mm.
1-3. Calculation of Difference ΔEab Between Maximum Value and Minimum Value A liquid crystal display device having a polarizer on a liquid crystal display element (product name "EV2450", available from EIZO, horizonal: 527.0 mm, vertical: 596.4 mm, the absorption axis of the polarizer being in parallel to the vertical direction of the screen, backlight: backlight using white light emitting diode) was prepared. The liquid crystal display device was regarded as the laminate 2. The liquid crystal display device (the laminate 2) was displayed in white in a darkroom environment, and the measurement 2 in this description was performed using product name "EzContrast" of ELDIM at each angle. The measurement area was a 2-mm diameter circle (with an area of about 3.14 $mm^2$).

Then, the laminate 1 was produced by disposing the optical film of each of Examples and Comparative Examples on the liquid crystal display device via adhesive layers. At this time, the disposition was such that the absorption axis of the polarizer and the slow axis of the plastic film of the optical film made 90 degrees. Then, the laminate 1 was displayed in white in a darkroom environment, and the measurement 1 in this description was performed using product name "EzContrast" of ELDIM at each angle. The measurement area was a 2-mm diameter circle (with an area of about 3.14 $mm^2$) and coincided with the area in the measurement 2.

The measurements 1 and 2 were performed at the in-plane center positions of the laminate 1 and the laminate 2.

Then, the ΔEab at each azimuth angle was calculated according to steps (3-1) to (3-4) in this specification, and the difference between the maximum value and the minimum value of ΔEab was further calculated. Steps (3-1) to (3-4) were performed using product name "EzContrast" of ELDIM and a software "EzCom" attached thereto (the gradation in step (3-1) above was in sixteen gradations). Table 1 shows the results.

The averages of L* values, a* values, and b* values and the variations (3σ) in L* values, a* values, and b* values in the state of the laminate 2 were as follows. In other words, the averages of L* values, a* values, and b* values and the variations (3σ) in L* values, a* values, and b* values in the measurement 2 were as follows.

Average of L* values at all angles: 95.9
Average of a* values at all angles: 4.2
Average of b* values at all angles: −4.6
Variation (3σ) of L* values at all angles: 113.3
Variation (3σ) of a* values at all angles: 10.7
Variation (3σ) of b* values at all angles: 14.1

1-4. Evaluation of Rainbow Unevenness

The laminate 1 was produced in the same manner as in 1-3 above. At that time, the disposition was such that the slow axis of the biaxially stretched plastic film of the optical film was orthogonal to the absorption axis of the polarizer of the polarizing plate. The surface light source (liquid crystal display element) was displayed in white in a darkroom environment, and the face was moved up, down, left, and right at a distance of 30 cm or more and 100 cm or less from the laminate 1 to view the display from the directions of ±90 degrees in the vertical direction and ±90 degrees in the horizontal direction. The evaluators healthy people in their 20s with a visual acuity of 0.7 or higher and evaluated the presence or absence of rainbow unevenness with their naked eyes according to the following criteria. The visual acuity also includes corrected visual acuity.
A: No rainbow unevenness is visible even when viewed from any position and in any direction.
B: There are a few positions and/or directions in which rainbow unevenness is visible in a small part of the area.
C: There are many positions and/or directions in which rainbow unevenness is visible in a small part of the area.
D: There are many positions and/or directions in which rainbow unevenness is visible in a most part of the area.

1-5. Evaluation of Color Distortion

The laminate 1 was produced in the same manner as in 1-3 above. At that time, the disposition was such that the slow axis of the biaxially stretched plastic film of the optical film was orthogonal to the absorption axis of the polarizer of the polarizing plate. The surface light source (liquid crystal display element) was displayed in white in a darkroom environment, and the laminate 1 was observed around the circumference with the elevation angle fixed to about $(\alpha+\beta)/2$. The observation can be regarded as an observation performed with the elevation angle fixed to about $(\alpha+\beta)/2$ at an azimuth angle of 0 to 359 degrees. The observation was performed at a distance of 30 cm or more and 100 cm or less from the laminate 1. The evaluators healthy people in their 20s with a visual acuity of 0.7 or higher and evaluated the presence or absence of color distortion with their naked eyes. The visual acuity also includes corrected visual acuity.
A: Appearance of colors is the same at all azimuth angles.
B: There are a few azimuth angles at which colors appear different.
C: There are many azimuth angles at which colors appear different.
D: Colors appear different at most azimuth angles.

1-6. Measurement of Reflectance

On the biaxially stretched plastic film side of the optical film of each of Examples and Comparative Examples, a sample (5 cm×5 cm) in which a black plate (KURARAY CO., LTD, product name "COMOGLAS DFA2CG 502K (Black) type", total light transmittance 0%, the thickness of 2 mm, refractive index 1.49) was bonded via a transparent pressure-sensitive adhesive layer with a thickness of 25 μm (PANAC CO., LTD., product name "Panaclean PD-S1", refractive index 1.49) was produced.

A direction perpendicular to the surface on the low-refractive index layer side of the sample is taken as 0 degrees, light was incident on the sample from a direction of 5 degrees, and the reflectance (visual reflectance Y value) was measured based on the specularly reflected light of the incident light. The reflectance was determined by measuring a 5° specular reflectance in the wavelength range of 380 nm or more and 780 nm or less using a spectral reflectance measuring instrument (SHIMADZU CORPORATION, product name: MPC3100), to calculate a value showing the visual reflectance using a software that converts the light as the brightness that humans perceive (built in MPC3100, conditions for calculating reflectance: C light source, view angle: 2 degrees). The reflectances of each sample at ten sites were measured, and the average thereof was used as the reflectance of each sample.

2. Production and Preparation of Biaxially Stretched Polyester Film

[Biaxially Stretched Polyester Film 1]

1 kg of PET (melting point 258° C., absorption center wavelength: 320 nm) and 0.1 kg of ultraviolet absorber (2,2'-(1,4-phenylene)bis(4H-3,1-benzoxazinone-4-one) were melt-mixed in a kneader at 280° C. to produce pellets containing an ultraviolet absorber. The pellets and PET having a melting point of 258° C. were put into a single-screw extruder, melt-kneaded at 280° C., extruded from a T die, and cast onto a cast drum with the surface temperature controlled to 25° C., to obtain a casting film. The amount of the ultraviolet absorber in the casting film was 1 part by mass with respect to 100 parts by mass of PET.

The casting film obtained was heated by a roll group set to 95° C., and the film was stretched 3.3 times in the flow direction, while heating both the front and back sides of the film with a radiation heater so that the film temperature at the 250 mm point of the stretching section 400 mm (the start point is the stretching roll A, the end point is the stretching roll B, and the stretching rolls A and B each have two nip rolls) was 103° C. and then cooled once. During heating with the radiation heater, a wind of 92° C. and 4 m/s was blown toward the film from the opposite side of the film of the radiation heater, to generate turbulent flow on the front and back sides of the film, so that the temperature uniformity of the film was disturbed.

Subsequently, both sides of the uniaxially stretched film are subjected to corona discharge treatment in air to set the wetting tension of the base film to 55 mN/m, and the corona discharge-treated surfaces on both sides of the film were in-line coated with "a coating solution for slippery layers, containing a polyester resin with a glass transition temperature of 18° C., a polyester resin with a glass transition temperature of 82° C., and silica particles with an average particle size of 100 nm", to form a slippery layer.

Then, the uniaxially stretched film is guided to a tenter, preheated with hot air at 95° C., and then stretched 4.5 times in the film width direction at a temperature of 105° C. for the first stage and 140° C. for the second stage. Here, when the transverse stretching section is divided into two, the stretched amount of the film (film width at measurement point—film width before stretching) at the midpoint of the transverse stretching section was stretched in two steps so as to be 80% of the stretched amount at the end of the transverse stretching section. The transversely stretched film was heated, as it was, in the tenter stepwise with hot air from 180° C. to a heat treatment temperature of 245° C., followed by 1% relaxation treatment in the width direction under the same temperature conditions, further quenching to 100° C., and then 1% relaxation treatment in the width direction. Thereafter, the film was wound up, to obtain a biaxially stretched polyester film 1 (biaxially stretched polyester film to be used in Example 1) with a thickness of 40 μm.

[Biaxially Stretched Polyester Film 2]

As a biaxially stretched polyester film to be used in Comparative Example 1, a commercially available biaxially stretched polyester film (TOYOBO CO., LTD., product name: Cosmoshine A4100, thickness: 50 μm) was prepared.

[Biaxially Stretched Polyester Film 3]

A biaxially stretched polyester film 3 (biaxially stretched polyester film to be used in Example 2) with a thickness of 40 μm was obtained in the same manner as in the biaxially stretched polyester film 1, except that the stretching ratio in the width direction was changed from 4.5 times to 5.1 times.

[Biaxially Stretched Polyester Film 4]

A biaxially stretched polyester film 4 (biaxially stretched polyester film to be used in Example 3) was obtained in the same manner as in the biaxially stretched polyester film 3, except that the thickness of the casting film of the biaxially stretched polyester film 1 was increased, and the final thickness was changed to 80 μm.

[Biaxially Stretched Polyester Film 5]

As a biaxially stretched polyester film to be used in Comparative Example 2, a commercially available biaxially stretched polyester film (Toray Industries, Inc., product name: 75U403, thickness: 75 μm) was prepared.

[Biaxially Stretched Polyester Film 6]

As a biaxially stretched polyester film to be used in Comparative Example 3, a commercially available biaxially stretched polyester film (TOYOBO CO., LTD., product name: Cosmoshine A4300, thickness: 23 μm) was prepared.

3. Production of Optical Film

Example 1

Onto the biaxially stretched polyester film 1 produced in section 2 above, a coating solution for forming hard coating layer prescribed as follows was applied, followed by drying at 70° C. for 1 minute, to evaporate the solvent. Subsequently, a hard coating layer (dry thickness: 10 μm) was formed by UV irradiation (100 mJ/cm$^2$).

A coating solution 1 for forming low-refractive index layer prescribed as follows was applied onto the hard coating layer, followed by drying at 60° C. for 1 minute, to evaporate the solvent. Subsequently, a low-refractive index layer (dry the thickness of 100 nm) was formed by UV irradiation (200 mJ/cm$^2$), to obtain an optical film of Example 1.

<Coating Solution for Forming Hard Coating Layer>
  Ultraviolet curable acrylate-containing composition: 22 parts by mass (Nippon Kayaku Co., Ltd., product name "KAYARAD PET-30", solid content: 100%)
  Ultraviolet curable acrylate-containing composition: 17 parts by mass (DKS Co. Ltd., product name "New-Frontier R-1403M", solid content: 80%)
  Fluorine leveling agent: 1 part by mass (DIC Corporation, product name "MEGAFACE F-568")
  Photopolymerization initiator: 1 part by mass (IGM Resins B.V., product name "Omnirad 184")
  Methyl isobutyl ketone: 15 parts by mass
  Methyl ethyl ketone: 44 parts by mass <Coating Solution for Forming Low-Refractive Index Layer>
  Ultraviolet curable acrylate-containing composition: 1 part by mass
  (Nippon Kayaku Co., Ltd., product name "KAYARAD PET-30", solid content: 100%)
  Photopolymerization initiator: 0.2 parts by mass
  (IGM Resins B.V., product name "Omnirad 127")
  Hollow silica particles: 1.3 parts by mass
  (average primary particle size: 60 nm)
  Solid silica particles: 0.7 parts by mass
  (average primary particle size: 15 nm)
  Leveling agent: 0.1 parts by mass
  (Dainichiseika Color & Chemicals Mfg. Co., Ltd., product name "SEIKABEAM 10-28(MB)")
  Dilute solvent: 90 parts by mass
  (MIBK/AN=7/3)

Examples 2 and 3

The optical films of Examples 2 and 3 were obtained in the same manner as in Example 1, except that the biaxially stretched polyester film 1 was changed to the biaxially stretched polyester films 3 and 4 prepared in section "2" above.

Comparative Example 1

The optical film of Comparative Example 1 was obtained in the same manner as in Example 1, except that the biaxially stretched polyester film 1 was changed to the biaxially stretched polyester film 2 prepared in section "2" above.

Comparative Examples 2 and 3

The optical films of Comparative Examples 2 and 3 were obtained in the same manner as in Example 1, except that the biaxially stretched polyester film 1 was changed to the biaxially stretched polyester films 5 and 6 prepared in section "2" above.

Reference Example 1

A simple substance of the biaxially stretched polyester film 3 (film with no hard coating layer and no low-refractive index layer formed on the biaxially stretched polyester film 3) was used as the optical film of Reference Example 1.

Reference Example 2

A simple substance of the biaxially stretched polyester film 2 (film with no hard coating layer and no low-refractive index layer formed on the biaxially stretched polyester film 2) was used as the optical film of Reference Example 2.

Reference Example 3

A simple substance of a commercially available uniaxially stretched polyester film (TOYOBO CO., LTD., product name "Cosmoshine TA048", thickness: 80 μm) was used as the optical film of Reference Example 3.

TABLE 1

| | | Example 1 | Example 2 | Example 3 | Comparative Example 1 | Comparative Example 2 | Comparative Example 3 | Reference Example 1 | Reference Example 2 | Reference Example 3 |
|---|---|---|---|---|---|---|---|---|---|---|
| In-plane phase difference (nm) | Re1 | 459 | 1213 | 2029 | 2181 | 2945 | 911 | The same as in Example 2 | The same as in Comparative Example 1 | 8125 |
| | Re2 | 453 | 1190 | 1973 | 2196 | 3012 | 923 | | | 8287 |
| | Re3 | 450 | 1201 | 2008 | 2204 | 2777 | 917 | | | 8221 |
| | Re4 | 458 | 1196 | 2000 | 2210 | 2829 | 935 | | | 8321 |
| | Re5 | 455 | 1189 | 1966 | 2218 | 2912 | 934 | | | 8329 |
| | Average of Re | 455 | 1198 | 1995 | 2202 | 2895 | 924 | | | 8257 |
| Slow axis direction (degree) | D1 | 82.00 | 83.00 | 76.00 | 58.37 | 61.05 | 59.22 | | | 89.51 |
| | D2 | 86.00 | 85.00 | 83.00 | 58.06 | 61.34 | 58.75 | | | 89.44 |
| | D3 | 86.00 | 81.00 | 79.00 | 58.24 | 60.97 | 58.55 | | | 89.55 |
| | D4 | 85.00 | 80.00 | 84.00 | 58.05 | 61.72 | 59.38 | | | 89.87 |
| | D5 | 79.00 | 84.00 | 80.00 | 56.88 | 60.61 | 59.15 | | | 89.55 |
| | Condition 2: Maximum value − Minimum value | 7.00 | 5.00 | 8.00 | 1.49 | 1.11 | 0.83 | | | 0.43 |
| Phase difference in thickness direction (nm) | Rth1 | 5900 | 6931 | 13180 | 8017 | 11014 | 3521 | | | 8240 |
| | Rth2 | 6015 | 6959 | 12979 | 7955 | 11337 | 3557 | | | 6883 |
| | Rth3 | 6061 | 6747 | 12567 | 7869 | 10268 | 3471 | | | 7176 |
| | Rth4 | 5966 | 6913 | 13334 | 7925 | 10331 | 3444 | | | 7890 |
| | Rth5 | 5990 | 6718 | 12670 | 8014 | 10545 | 3492 | | | 7862 |
| | Average of Rth | 5986 | 6854 | 12946 | 7956 | 10699 | 3497 | | | 7610 |
| Re/Rth | Re1/Rth1 | 0.078 | 0.175 | 0.154 | 0.272 | 0.267 | 0.259 | | | 0.986 |
| | Re2/Rth2 | 0.075 | 0.171 | 0.152 | 0.276 | 0.266 | 0.259 | | | 1.204 |
| | Re3/Rth3 | 0.074 | 0.178 | 0.160 | 0.280 | 0.270 | 0.264 | | | 1.146 |
| | Re4/Rth4 | 0.077 | 0.173 | 0.150 | 0.279 | 0.274 | 0.271 | | | 1.055 |
| | Re5/Rth5 | 0.076 | 0.177 | 0.155 | 0.277 | 0.276 | 0.267 | | | 1.059 |
| | Average of Re/Rth | 0.076 | 0.175 | 0.154 | 0.277 | 0.271 | 0.264 | | | 1.090 |
| Presence or absence of low-refractive index layer | | Present | Present | Present | Present | Present | Present | Absent | Absent | Absent |
| Reflectance [%] | | 1.0 | 1.0 | 1.0 | 1.0 | 1.0 | 1.0 | Unmeasured | Unmeasured | Unmeasured |
| (α + β)/2 [degree] | | 21.2 | 37.7 | 38.2 | 48.9 | 51.1 | 47.6 | 37.7 | 48.9 | Unmeasured |
| Difference between maximum value and minimum value of ΔEab | | 15.1 | 16.4 | 16.7 | 17.1 | 17.8 | 17.3 | 18.1 | 20.4 | Unmeasured |
| Rainbow unevenness | | A | A | A | B | C | B | B | D | A |
| Color distortion | | A | B | B | C | D | C | B | D | Not evaluated |
| Folding resistance (TD) | | 10 degree | 10 degree | 20 degree | 0 degree | 0 degree | 0 degree | The same as in Example 2 | The same as in Comparative Example 1 | Broken |
| Folding resistance (MD) | | 10 degree | 10 degree | 20 degree | 30 degree | 30 degree | 30 degree | | | 55 degree |

From the results of Table 1, it can be confirmed that the optical films of Examples in which the difference between the maximum value and the minimum value of ΔEab is less than 17.0 can suppress rainbow unevenness when viewed with the naked eyes without increasing the in-plane phase difference. Further, it can be confirmed from the results of Table 1 that the optical films of Examples in which the difference between the maximum value and the minimum value of ΔEab is less than 17.0 can suppress color distortion. In contrast, it can be confirmed that the optical films of Comparative Examples cannot suppress rainbow unevenness and color distortion in spite of having a low-refractive index layer and a reflectance equivalent to the optical films of Examples.

Further, it can be confirmed that the optical films of Examples can suppress folding habits remaining after the folding test or breakage, regardless of the folding direction (the optical films of Examples are less likely to have folding habits remaining and do not break, as compared with a uniaxially stretched polyester film (Reference Example 3) and general biaxially stretched films (Comparative Examples 1 to 3)).

The ΔEab in Table 1 was based on the measurement results at the in-plane center position of the laminate 1 and the laminate 2, but the same results were obtained even if the measurement point was shifted (for example, the ΔEab at each of 130 mm to the left from the center position (other measurement point 1), 130 mm to the right from the center position (other measurement point 2), 75 mm above the center position (other measurement point 3), and 75 mm below the center position (other measurement point 4) was almost the same as the value in Table 1).

REFERENCE SIGNS LIST

10: Plastic film
20: Hard coating layer
30: Low-refractive index layer
100: Optical film
200: Surface light source
300: Polarizer
400: Adhesive layer
500: First transparent protective plate
600: Second transparent protective plate
700: Polarizing plate

800: Display element
1000: Image display device
X: Laminate 1
Y: Laminate 2

The invention claimed is:

1. An optical film comprising a low-refractive index layer on a plastic film, wherein
the plastic film is a biaxially stretched plastic film with an in-plane phase difference of 2500 nm or less,
the low-refractive index layer is located on an outermost surface of the optical film, and
the optical film comprises a region in which a difference between a maximum value and a minimum value of ΔEab is less than 17.0, wherein the ΔEab is calculated as follows:
a laminate 1 is subjected to measurement 1 to calculate L* value, a* value, and b* value in a L*a*b* color system; a laminate 2 is subjected to measurement 2 to calculate L* value, a* value, and b* value in a L*a*b* color system; and based on a results of the measurement 1 and the measurement 2, the ΔEab is calculated under condition 1:

<Measurement 1>
the laminate 1 is produced by laminating a polarizer and the optical film on a surface light source in this order; in the laminate 1, the optical film is disposed so that the surface on the low-refractive index layer side faces the side opposite to the polarizer; and the polarizer is disposed so that an angle formed by an absorption axis of the polarizer and a horizontal or vertical direction of the surface light source falls within ±5 degrees, and the angle formed by the absorption axis of the polarizer and a slow axis of the biaxially stretched plastic film of the optical film falls within 90 degrees±5 degrees,
the surface light source of the laminate 1 is displayed in white, a transmitted light emitted from the low-refractive index layer side of the laminate 1 is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle; and the transmitted light measurement area is set to any in-plane area of 1 mm² or more and 10 mm² or less;

<Measurement 2>
the laminate 2 is produced by laminating a polarizer on a surface light source that is the same as the surface light source in the measurement 1; the polarizer is disposed so that a direction of the absorption axis of the polarizer with respect to the surface light source is the same direction as in the measurement 1,
the surface light source of the laminate 2 is displayed in white, transmitted light emitted from the polarizer side of the laminate 2 is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle; and a transmitted light measurement area substantially coincides with that in the measurement 1 in the plane; and <Condition 1>
at each elevation angle and each azimuth angle, ΔL* is calculated by subtracting the L* value in the measurement 2 from the L* value in the measurement 1; values from a maximum value to a minimum value of the ΔL* are converted to grayscale to a predetermined gradation and displayed in grayscale in two-dimensional coordinates with the elevation angle as concentric circles and the azimuth angle in the vertical and horizontal directions,
it is confirmed that there are two regions in which the ΔL* is concentrically distributed in the two-dimensional coordinates, and that the two regions are in substantially symmetric positions in the two-dimensional coordinates,
with respect to the elevation angle located at a center of a region where the ΔL* is concentrically distributed, one elevation angle is referred to as α degree(s) and the other elevation angle is referred to as β degree(s), and the ΔEab at each azimuth angle is calculated from the differences between the L* value, the a* value, and the b* value in the measurement 1 with an azimuth angle of 0 degrees or more and 359 degrees or less at an elevation angle of (α+β)/2 and the L* value, the a* value, and the b* value in the measurement 2 with an azimuth angle of 0 degrees or more and 359 degrees or less at an elevation angle of (α+β)/2, respectively.

2. The optical film according to claim 1, wherein the plastic film is a biaxially stretched plastic film having the in-plane phase difference to a phase difference in a thickness direction of 0.10 or less.

3. The optical film according to claim 1, comprising one or more layers selected from a hard coating layer, an anti-glare layer, and a high-refractive index layer between the plastic film and the low-refractive index layer.

4. The optical film according to claim 1, wherein the plastic film has a thickness of 15 μm or more and 200 μm or less.

5. A polarizing plate comprising a polarizer, a first transparent protective plate disposed on one side of the polarizer, and a second transparent protective plate disposed on the other side of the polarizer, wherein at least one selected from the group consisting of the first transparent protective plate and the second transparent protective plate is the optical film according to claim 1.

6. An image display device comprising a display element, and a polarizer and an optical film disposed on a light emitting surface side of the display element, wherein the optical film is the optical film according to claim 1, and disposition is such that an angle formed by the absorption axis of the polarizer and the slow axis of the biaxially stretched plastic film of the optical film falls within 90 degrees±5 degrees, and that the surface on the low-refractive index layer side of the optical film faces a side opposite to the display element.

7. An image display device comprising a display element, and a polarizer and an optical film disposed on a light emitting surface side of the display element, wherein
disposition is such that an angle formed by a direction of the absorption axis of the polarizer and a horizontal or vertical direction of the display element falls within ±5 degrees, and
that the angle formed by the absorption axis of the polarizer and a slow axis of a biaxially stretched plastic film of the optical film falls within 90 degrees±5 degrees, and
the optical film comprises a low-refractive index layer on the biaxially stretched plastic film with an in-plane phase difference of less than 2500 nm, the low-refractive index layer is located on an outermost surface of the optical film, and the optical film comprises a region in which a difference between a maximum value and a minimum value of ΔEab is less than 17.0, wherein the ΔEab is calculated as follows:

a laminate 1A is subjected to measurement 1A to calculate L* value, a* value, and b* value in a L*a*b* color system; a laminate 2A is subjected to measurement 2A to calculate L* value, a* value, and b* value in a L*a*b* color system; and based on a results of the measurement 1A and the measurement 2A, the ΔEab is calculated under condition 1A:

<Measurement 1A> the laminate 1A is produced by laminating the polarizer and the optical film on the display element in this order; in the laminate 1A, the optical film is disposed so that the surface on the low-refractive index layer side faces a side opposite to the polarizer; and the polarizer is disposed so that the angle formed by the absorption axis of the polarizer and the horizontal or vertical direction of the display element falls within ±5 degrees, and the angle formed by the absorption axis of the polarizer and the slow axis of the biaxially stretched plastic film of the optical film falls within 90 degrees±5 degrees, the display element of the laminate 1A is displayed in white, a transmitted light emitted from the low-refractive index layer side of the laminate 1A is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle; and the transmitted light measurement area is set to any in-plane area of 1 mm$^2$ or more and 10 mm$^2$ or less;

<Measurement 2A> the laminate 2A is produced by laminating the polarizer on the display element that is the same as the display element in the measurement 1A, the display element of the laminate 2A is displayed in white, transmitted light emitted from the polarizer side of the laminate 2A is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle; and transmitted light measurement area substantially coincides with that in the measurement 1A in the plane; and <Condition 1A> at each elevation angle and each azimuth angle, ΔL* is calculated by subtracting the L* value in the measurement 2A from the L* value in the measurement 1A; values from a maximum value to a minimum value of the ΔL* are converted to grayscale to a predetermined gradation and displayed in grayscale in two-dimensional coordinates with the elevation angle as concentric circles and the azimuth angle in the vertical and horizontal directions, it is confirmed that there are two regions in which the ΔL* is concentrically distributed in the two-dimensional coordinates, and that the two regions are in substantially symmetric positions in the two-dimensional coordinates, with respect to the elevation angle located at a center of the region where the ΔL* is concentrically distributed, one elevation angle is referred to as α degree(s) and the other elevation angle is referred to as β degree(s), and the ΔEab at each azimuth angle is calculated from the differences between the L* value, the a* value, and the b* value in the measurement 1A with an azimuth angle of 0 degrees or more and 359 degrees or less at an elevation angle of (α+β)/2 and the L* value, the a* value, and the b* value in the measurement 2A with an azimuth angle of 0 degrees or more and 359 degrees or less at an elevation angle of (α+β)/2, respectively.

8. A method for selecting an optical film of an image display device comprising a display element, and a polarizer and an optical film on a light emitting surface of the display element, wherein disposition is such that a direction of an absorption axis of the polarizer is parallel to a horizontal or vertical direction of the display element, the method comprising selecting, as the optical film, an optical film X satisfying determination conditions that the optical film X comprises a low-refractive index layer on a biaxially stretched plastic film with an in-plane phase difference of less than 2500 nm, the low-refractive index layer is located on an outermost surface of the optical film X, and the optical film X comprises a region in which a difference between a maximum value and a minimum value of ΔEab is less than 17.0, wherein the ΔEab is calculated as follows:

a laminate 1B is subjected to measurement 1B to calculate L* value, a* value, and b* value in a L*a*b* color system; a laminate 2B is subjected to measurement 2B to calculate L* value, a* value, and b* value in a L*a*b* color system; and based on a results of the measurement 1B and the measurement 2B, the ΔEab is calculated under condition 1B:

<Measurement 1B> the laminate 1B is produced by laminating the polarizer and the optical film X on the display element in this order; in the laminate 1B, the optical film is disposed so that the surface on the low-refractive index layer side faces a side opposite to the polarizer; and the polarizer is disposed so that n angle formed by the absorption axis of the polarizer and the horizontal or vertical direction of the display element falls within ±5 degrees, and the angle formed by the absorption axis of the polarizer and a slow axis of the biaxially stretched plastic film of the optical film X falls within 90 degrees±5 degrees, the display element of the laminate 1B is displayed in white, transmitted light emitted from the low-refractive index layer side of the laminate 1B is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle; and the transmitted light measurement area is set to any in-plane area of 1 mm$^2$ or more and 10 mm$^2$ or less;

<Measurement 2B> the laminate 2B is produced by laminating the polarizer on the display element that is the same as the display element in the measurement 1B, the display element of the laminate 2B is displayed in white, transmitted light emitted from the polarizer side of the laminate 2B is measured at 1 degree intervals in ranges of an elevation angle of 0 degrees or more and 80 degrees or less and an azimuth angle of 0 degrees or more and 359 degrees or less, to calculate L* value, a* value, and b* value in the L*a*b* color system based on the transmitted light at each angle; and a transmitted light measurement area substantially coincides with that in the measurement 1B in the plane; and <Condition 1B> at each elevation angle and each azimuth angle, $\Delta L^*$ is calculated by subtracting the $L^*$ value in the measurement 2B from the $L^*$ value in the measurement 1B; values from a maximum value to a minimum value of the $\Delta L^*$ are converted to grayscale to a predetermined gradation and displayed in grayscale in two-dimensional coordinates with the elevation angle as concentric circles and the azimuth angle in the vertical and horizontal directions, it is confirmed that there are two regions in which the $\Delta L^*$ is concentrically distributed in the two-dimensional coordinates, and that the two regions are in substantially symmetric positions in the two-dimensional coordinates, with respect to the elevation angle located at the center of a region where the $\Delta L^*$ is concentrically distributed, one elevation angle is referred to as $\alpha$ degree(s) and the other elevation angle is referred to as $\beta$ degree(s), and the $\Delta Eab$ at each azimuth angle is calculated from the differences between the $L^*$ value, the $a^*$ value, and the $b^*$ value in the measurement 1B with an azimuth angle of 0 degrees or more and 359 degrees or less at an elevation angle of $(\alpha+\beta)/2$ and the $L^*$ value, the $a^*$ value, and the $b^*$ value in the measurement 2B with an azimuth angle of 0 degrees or more and 359 degrees or less at an elevation angle of $(\alpha+\beta)/2$, respectively.

* * * * *